United States Patent
Lerner

(10) Patent No.: US 9,977,116 B2
(45) Date of Patent: May 22, 2018

(54) SCALING FIXED-POINT FAST FOURIER TRANSFORMS IN RADAR AND SONAR APPLICATIONS

(71) Applicant: ANALOG DEVICES, INC., Norwood, MA (US)

(72) Inventor: Boris Lerner, Sharon, MA (US)

(73) Assignee: ANALOG DEVICES, INC., Norwood, MA (US)

(*) Notice: Subject to any disclaimer, the term of this patent is extended or adjusted under 35 U.S.C. 154(b) by 377 days.

(21) Appl. No.: 14/875,281

(22) Filed: Oct. 5, 2015

(65) Prior Publication Data
US 2017/0097405 A1    Apr. 6, 2017

(51) Int. Cl.
*G01S 7/35* (2006.01)
*G01S 13/42* (2006.01)
(Continued)

(52) U.S. Cl.
CPC .............. *G01S 7/352* (2013.01); *G01S 13/42* (2013.01); *G01S 13/583* (2013.01); *G01S 15/42* (2013.01);
(Continued)

(58) Field of Classification Search
CPC .... G01S 7/352; G01S 2007/356; G01S 13/42; G01S 13/583; G01S 15/42; G01S 15/58
See application file for complete search history.

(56) References Cited

U.S. PATENT DOCUMENTS

| | | | |
|---|---|---|---|
| 4,231,102 A | 10/1980 | Barr et al. | |
| 5,303,172 A | * 4/1994 | Magar | G06F 9/30014 708/406 |

(Continued)

FOREIGN PATENT DOCUMENTS

| | | |
|---|---|---|
| JP | 2007-0535847 | 12/2007 |
| JP | 2015-517104 | 6/2015 |
| KR | 60-176176 | 9/1985 |

OTHER PUBLICATIONS

Shaik Qadeer et al., "On Fixed Point Error Analysis of FFT Algorithm", Proc. of Int. Colloquiums on Computer Electronics Electrical Mechanical and Civil 2011, © 2011 ACEEE, 4 pages.

(Continued)

*Primary Examiner* — Peter M Bythrow
(74) *Attorney, Agent, or Firm* — Patent Capital Group

(57) ABSTRACT

Present disclosure describes an improved scaling mechanism for a multi-stage fixed-point FFT algorithm used to process signals received by radar or sonar systems. Proposed scaling includes scaling an output of every pair of consecutive butterfly stages of the FFT algorithm by a scaling factor equal to two times of the inverse of a growth factor for the pair of consecutive butterfly stages for the FFT algorithm for a purely complex exponential input signal. Besides this scaling, input signals are allowed to overflow by saturation. Such mechanism yields adequate performance of radar and sonar receivers implementing fixed-point FFTs for any types of input signals, from random to substantially complex exponential or sinusoidal signals. Proposed scaling achieves a balance between having signal to noise ratio (SNR) that is possible to obtain for a particular input signal and SNR that is needed to successfully process that signal for radar and sonar applications.

20 Claims, 19 Drawing Sheets

300

(51) Int. Cl.
   *G01S 13/58* (2006.01)
   *G01S 15/42* (2006.01)
   *G01S 15/58* (2006.01)

(52) U.S. Cl.
   CPC ......... *G01S 15/58* (2013.01); *G01S 2007/356* (2013.01)

(56) References Cited

U.S. PATENT DOCUMENTS

| | | | | |
|---|---|---|---|---|
| 7,197,525 | B2* | 3/2007 | Stein | G06F 17/142 708/409 |
| 7,660,840 | B2* | 2/2010 | Taunton | G06F 9/30014 708/404 |
| 7,679,545 | B2 | 3/2010 | Rausch et al. | |
| 7,835,454 | B2* | 11/2010 | Armstrong | G06F 17/142 375/219 |
| 8,218,426 | B2* | 7/2012 | Sampath | G06F 17/142 370/210 |
| 8,516,027 | B2 | 4/2013 | Dobart et al. | |
| 8,493,262 | B2 | 6/2013 | Boufounos et al. | |
| 8,572,149 | B2* | 10/2013 | Banister | G06F 17/142 708/400 |
| 8,917,588 | B2* | 12/2014 | Hwang | H04L 27/263 370/210 |
| 9,739,879 | B2 | 9/2017 | Rohling | |
| 2003/0088601 | A1* | 5/2003 | Pitsianis | G06F 9/30032 708/622 |
| 2004/0059766 | A1* | 3/2004 | Yeh | G06F 17/142 708/406 |
| 2004/0111227 | A1* | 6/2004 | Stein | G06F 17/142 702/77 |
| 2005/0160127 | A1* | 7/2005 | Swartzlander, Jr. | G06F 17/142 708/404 |
| 2005/0243938 | A1 | 11/2005 | Armstrong et al. | |
| 2007/0162533 | A1* | 7/2007 | Wada | G06F 17/142 708/404 |
| 2009/0085796 | A1* | 4/2009 | Kuroda | G01S 7/354 342/129 |
| 2009/0268603 | A1* | 10/2009 | Sampath | G06F 17/142 370/210 |
| 2014/0164460 | A1* | 6/2014 | Hsieh | G06F 17/142 708/403 |

OTHER PUBLICATIONS

"Complex Fixed-Point Fast Fourier Transform Optimization for AltiVec™", Freescale Semiconductor, Application Note, Document No. AN2114, Rev. 4, Apr. 2013, 21 pages.

Mario Garrido Gálvez et al., "Pipelined Radix-2(k) Feedforward FFT Architectures", © 2013 IEEE Transactions on Very Large Scale Integration (vlsi) Systems, (21), 1, 23-32, 11 pages.

P. Kabal et al., "Performance of Fixed-Point FFT's: Rounding and Scaling Considerations", Proc. IEEE Int. Conf. Acoustics, Speech, Signal Processing (Tokyo), pp. 221-224, Apr. 1986, ICASSP 86, CH2243-4/86/0000-0221 © 1986 IEEE, 4 pages.

Office Action issued in KR Patent Application Serial No. 10-2016-0127661 dated Nov. 1, 2017, 13 pages, includes an EN Summary of OA.

English Machine Translation of KR 60-176176 (see 3 above).

* cited by examiner

SCALING FIXED-POINT FAST FOURIER TRANSFORMS IN RADAR AND SONAR APPLICATIONS

TECHNICAL FIELD OF THE DISCLOSURE

The present disclosure generally relates to digital-signal processing and, more particularly, to radar and sonar systems implementing fixed-point Fast Fourier Transform algorithms.

BACKGROUND

A radar receiver is an electronic device that receives signals in the form of electromagnetic waves in the radio range of approximately 3 kiloHertz (kHz) to 300 gigaHertz (GHz). A sonar receiver is an electronic device that receives signals in the form of acoustic waves. Radio and sonar receivers could be used to locate objects from the echo of signals that are reflected off the objects.

In order to locate objects, both radio and sonar receivers convert respective acquired signals into electrical signals which are then analyzed to extract information carried by the signals. The behavior of signals can be analyzed in the time domain (e.g., how the signal amplitude varies over time) as well as the frequency domain (i.e., the different frequency components that make up the signal), where the Fourier transform mathematically relates these two domains. In addition, a signal can be analyzed as a continuous waveform or, in digital-signal processing (DSP) applications, as a large set of time-domain points. Fast Fourier Transforms (FFTs) refer to algorithms for calculating discrete Fourier transforms (DFTs), as well as their inverses (IDFTs), of signals represented in digital form.

Because of the ubiquitous use of Fourier transforms across signal-processing applications, efforts have been made to improve its execution computationally—hence the many FFT approaches, such as e.g. decimation in time, decimation in frequency, radix-2, radix-4, mixed radix, etc. Still, further improvements in implementing FFTs are desired, in particular in context of radar and sonar applications, and especially those radar and sonar applications that could be implemented at relatively low cost and consume relatively low power.

OVERVIEW

Embodiments of the present disclosure provide mechanisms for scaling fixed-point FFT, particularly applicable, but not limited, to radar and sonar applications.

Present disclosure describes an improved scaling mechanism for a multi-stage fixed-point FFT algorithm used to process signals received by radar or sonar receivers to determine distances to, locations of, or velocities of objects. Proposed scaling includes scaling an output of every pair of butterfly stages, e.g. every pair of consecutive butterfly stages, of the FFT algorithm with a scaling factor equal to two times of the inverse of a growth factor for the pair of butterfly stages for the FFT algorithm for a purely complex exponential input signal and not taking any further actions trying to prevent overflow. Such scaling allows achieving a balance, for any type of input signals that could be handled by radar or sonar receivers, between having a signal to noise ratio (SNR) value that is possible to obtain for a particular input signal and an SNR value that is needed to successfully process that input signal.

In the present description of example embodiments, scaling is described with reference to multiplication of an output of every pair of consecutive butterfly stages with a certain scaling factor. However, a person of ordinary skill in the art would readily recognize that multiplication is just one non-limiting example because substantially the same scaling may be achieved by other means, such as e.g. by shifting or by dividing by a scaling factor that is the inverse of the factor used in scaling by multiplication. Therefore, all of the possible implementations of scaling that effectively carry out scaling by multiplication by scaling factor(s) as described herein are within the scope of the present disclosure.

One aspect of the present disclosure provides a radar system that includes a radar transmitter and a radar receiver. Another aspect of the present disclosure provides a sonar system that includes a sonar transmitter and a sonar receiver. Both systems include a data processing system. The radar transmitter is configured to transmit a radio signal which could comprise a frequency ramp, while the sonar transmitter is configured to transmit an acoustic signal which could comprise a frequency ramp. The radar receiver is configured to detect a radio signal including at least a portion of the transmitted radio signal reflected from an object and to generate an input signal for the data processing system based on the detected radio signal. The sonar receiver is configured to detect a sonar signal including at least a portion of the transmitted sonar signal reflected from an object and to generate an input signal for the data processing system based on the detected sonar signal. In both systems, the data processing system is configured to provide the input signal as an input to an FFT algorithm comprising two or more butterfly stages, scale an output of at least one pair, but preferably all pairs, of butterfly stages, e.g. consecutive butterfly stages, by a scaling factor equal to two times of the inverse of a growth factor for the pair of butterfly stages for the FFT algorithm for a complex exponential input signal, and determine one or more of an indication of a distance to the object, an indication of a velocity of the object, and an indication of a location of the object based on an output of the FFT algorithm.

Another aspect of the present disclosure provides a system for extracting a baseband signal of interest using an FFT algorithm. The system includes at least a data processing system configured to receive an input signal at an input to the FFT algorithm comprising two or more butterfly stages, where the input signal includes either a radio signal detected by one or more radio antennas or a sonar signal detected by one or more sonar sensors. The data processing system is further configured to scale, e.g. multiply, an output of every pair of consecutive butterfly stages by a scaling factor equal to two times of the inverse of a growth factor for the pair of consecutive butterfly stages for the FFT algorithm for a complex exponential input signal, and extract the baseband signal based on an output of a last stage of the two or more butterfly stages of the FFT algorithm.

In some embodiments, the FFT algorithm may include a radix-2 algorithm. In such embodiments, scaling may include scaling one butterfly stage of a pair by a scaling factor of 1 and scaling another butterfly stage of the pair of consecutive butterfly stages by a scaling factor of ½, which scaling could be implemented by e.g. using appropriate shifters.

In other embodiments, the FFT algorithm may include a radix-4 algorithm. In such embodiments, scaling may include scaling each butterfly stage by a scaling factor of ½, which scaling, again, could be implemented by e.g. using appropriate shifters.

In any of the above embodiments, the input signal may be or include a substantially complex exponential signal or a substantially sinusoidal signal, i.e. a signal with a prominent single-frequency component.

In any of the above embodiments, the data processing system may be configured to scale the output of every pair of consecutive butterfly stages allowing unlimited clipping due to saturation.

In any of the above embodiments, the system may further include one or more radio antennas when the input signal comprises the radio signal or one or more sonar sensors when the input signal comprises the sonar signal.

As will be appreciated by one skilled in the art, aspects of the present disclosure may be embodied in various manners—e.g. as a method, a system, a computer program product, or a computer-readable storage medium. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Functions described in this disclosure may be implemented as an algorithm executed by one or more processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g. to the existing radar or sonar receivers or/and their controllers, etc.) or be stored upon manufacturing of these devices and systems.

Other features and advantages of the disclosure are apparent from the following description, and from the claims.

DESCRIPTION OF EXAMPLE EMBODIMENTS OF THE DISCLOSURE

Figure 1A:
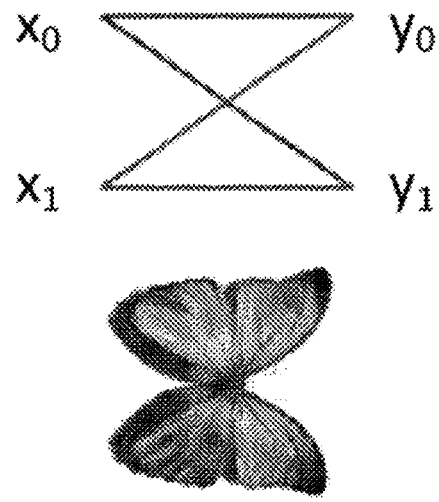
FIGS. 1A and 1B illustrate exemplary butterfly operations.

Basics of FFTs and Their Application in Radar and Sonar Systems

As previously described herein, FFTs refer to algorithms for computing discrete Fourier transforms and inverse discrete Fourier transforms of signals represented in digital form.

An FFT is an example of a transformation function that may be applied to acquired signals, e.g. received radio or sonar signals, transforming the acquired waveform (which may possibly be processed prior to the transformation, e.g. by multiplying the acquired waveform with a window function) from a time domain to a frequency domain. As a result, a frequency decomposition of a portion of the acquired signal is obtained.

Radar and sonar systems typically function as follows. First, a radar/sonar transmitter outputs a signal, an echo of which will be evaluated to locate an object. Often times a transmitter outputs a signal periodically. A signal transmitted by a transmitter is typically a chirp signal. As is well known, a chirp signal is a signal in which the frequency either increases or decreases with time, for former typically referred to as an "up-chirp" and the latter typically referred to as a "down-chirp." Other terms sometimes used interchangeably with the term "chirp" are "frequency ramp," "frequency sweep," or "sweep signal." In case of radar systems, the signals used are electromagnetic signals in the radio range. In case of sonar systems, the signals used are acoustic signals.

The transmitted signal is reflected from an object and the reflected, i.e. echoed, signal is acquired by a radar/sonar receiver, using appropriate sensors. In case of radar systems, appropriate sensors include at least one, but typically a plurality, of radio antennas. In case of sonar systems, appropriate sensors include at least one, but typically a plurality, of acoustic sensors.

A radar/sonar receiver converts the acquired reflected signal into an electrical input signal to be provided to a data processing unit of a radar/sonar system. The data processing unit then performs a series of operations on the input signal, which operations involve multiple applications of one or more FFT algorithms.

If a signal transmitted by a transmitter is a chirp signal, then the reflected signal is also a chirp signal. Since the object is at a certain distance away from the transmitter, the received chirp signal is phase shifted with respect to the transmitted chirp signal. The phase difference between the transmitted signal and the received reflected signal is directly proportional to how long it took the transmitted signal to reach the object and the reflected signal to come back, which, in turn, is proportional to the distance to the object. Thus, the phase difference is indicative of the distance to the object. Because transmitted signal is a chirp, the phase difference between the transmitted and the reflected chirps manifests itself as a phase difference in an FFT output resulting from applying FFT algorithms as described herein. Thus applying FFT algorithms to the received chirp signal allows estimating the distance to the object. In addition, applying FFT algorithms to the received chirp signal may also allow estimating other characteristics such as e.g. velocity of a moving object, direction of movement of an object, and/or location of an object with respect to the transmitter and/or the receiver.

One approach for processing detected radar signals using FFT algorithms is described below. However, other ways are also known to a person of ordinary skill in the art, all of which are within the scope of the present disclosure. Furthermore, while the following description is provided in context of radar systems, analogous descriptions are applicable to sonar systems, possibly with modifications that would be apparent to a person of ordinary skill in the art based on the descriptions provided herein.

A radar receiver detects signals reflected from objects using a radar antenna and creates a rectangle of data where each row is a sequence of samples of the received signal, with the next row being the next sequence of samples, all sequences together constituting one ramp. Then horizontal (windowed) FFTs are performed on each row of samples. Then vertical windowed FFTs are performed on the results of the horizontal FFTs and signals reflected from the objects and detected by the radar receiver show up as "peaks" in the magnitude of the result of the vertical windowed FFTs. The result of a vertical windowed FFT for a particular input antenna of a radar receiver is typically arranged in a two-dimensional array where one dimension, typically the horizontal axis of the array, indexes frequencies and the other dimension, typically the vertical axis of the array, indexes velocities of the objects. When the transmitted signal is a chirp, a frequency component of a peak in such an array, i.e. the value of frequency at which the peak appears as indicated on the horizontal axis, acts as a time stamp by being indicative of the phase difference between the transmitted and the reflected chirps, which, as described above, is directly proportional to how far the object is. Thus, the horizontal axis of the array is commonly described as indexing distances, or ranges, to the objects.

Denoting frequencies with a variable f and denoting velocities with a variable v means that each element of the array is indexed with certain pair of values (f, v), where a value off (i.e., the horizontal location of the element in the array) indicates object's position and a value of v (i.e., the vertical location of the element within the array) indicates object's velocity. Each element of such an array comprises a value derived from the result of the application of the vertical FFT and representing a magnitude of the acquired signal for a given pair of values of frequency and velocity. Each element of the array is typically referred to as a "frequency bin" or simply a "bin," the term "bin" being indicative of the fact that such an array may be considered as comprising a plurality of bins into which the energy of the acquired signal(s) is distributed. In various embodiments, the bins may contain either complex values or real values. For example, the real values could be presented in terms of positive real quantities X(f) of the complex values, the values representing magnitudes of the acquired signal, presented e.g. as an actual magnitude, a squared magnitude, or as a compressive transformation of a magnitude, such as a square root or a logarithm. Similar processing is done by sonar systems.

Frequency bins come into play in context of FFT algorithms employed by radar and sonar receivers in that separation of a particular radar or sonar signal of interest (i.e. a radar or sonar signal reflected from a particular object of interest) from the total signal acquired by a radar or a sonar sensor may be achieved by identifying which bin(s) correspond to the signal of interest and/or by identifying which bin(s) may be active. To that end, bin are evaluated to determine whether they contain values that satisfy one or more predefined criteria. For example one criterion could include comparing a value of a bin with a certain threshold value to determine whether the bin may be classified as containing a "peak" indicating that relatively large amount of energy of the acquired signal is concentrated in that bin. Various algorithms may be carried out in order to determine where to set the level threshold to indicate presence or absence of a peak in each bin, all of which algorithms are within the scope of the present disclosure.

In practice, a two-dimensional array of values as described above is typically generated for every input antenna and a radar receiver typically contains more than one antenna, thus making an array a three-dimensional array, the third dimension indexing different antennas. The above described processing is performed on every antenna rectangle slice of such a three-dimensional array, followed by the beam forming of the antennas.

What many different known FFT approaches have in common is that they do computation in stages by dividing the digital points representing a signal into subsets (in a process known as "decimation"), computing the DFT of each subset, and then processing the results of the DFT of each subset to produce a final result consisting of a set of frequency-domain points. Expressed differently, such FFT approaches break up DFT computation into stages where each stage computes a smaller DFT and then use some kind of structure to combine the results of the computation at different stages.

Figure 1B:
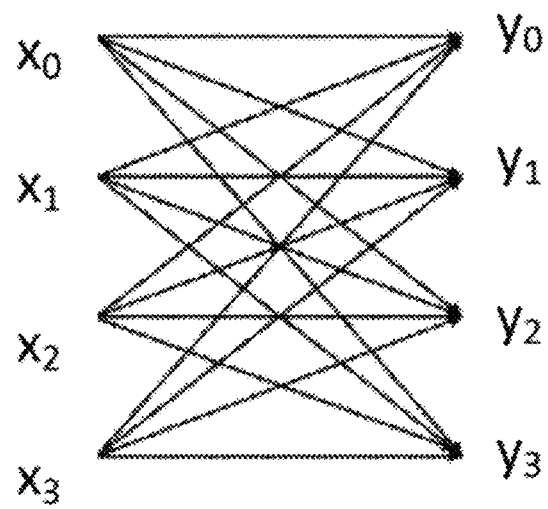

Most of the computational effort of the FFTs lies in the processing of the subsets. The processing occurs in a series of stages in which the subsets are first processed into intermediate results, the intermediate results are further processed, and so on, until the final set of frequency-domain points is produced. Each stage includes a plurality of parallel operations that each process n input points simultaneously to produce n output points—the value n is known as the "radix" of the FFT algorithm. Because a dataflow diagram of a radix-2 (i.e., a radix with a value of two) operation resembles a butterfly (as shown in FIG. 1A, in which input points x0, x1 are processed into output points y0, y1 in accordance with the equations y0=x0+t*x1 and y1=x0−t*x1), "t" being referred to as a "twiddle factor," these operations are known as "butterfly operations" or simply "butterflies." Operations having other radices are also known as butterfly operations (such as the radix-4 operation shown in FIG. 1B).

Floating-Point vs Fixed-Point Representations

The values within an FFT may be represented either as fixed-point numbers or floating-point numbers.

As is well-known in context of computing, a fixed-point number has a specific number of bits or digits reserved for the integer part (i.e. the part of the number to the left of the decimal point) and a specific number of bits reserved for the fractional part (i.e. the part of the number to the right of the decimal point). No matter how large or small a number is, it will always use the same number of bits for each portion. For example, if a fixed-point format is in decimal III-II.FFFFF, then the largest positive number that could be represented would be the binary 11111.11111=31.96875 if unsigned and 01111.11111=15.96875 if signed and the smallest positive would be binary 00000.00001=0.03125. Such representation requires that a processor processing such numbers has knowledge of where the decimal point is. In the following, "bits", which is inherently a binary representation, are sometimes described with reference to decimal representations, however, based on the descriptions provided herein a person of ordinary skill in the art would readily recognize which is which.

As is also well-known, a floating-point number does not reserve a specific number of bits for the integer part or the fractional part. Instead, it reserves a certain number of bits for the number (called the "mantissa" or "significand") and a certain number of bits to indicate where, within that number, the decimal place is (called the "exponent"). Thus, a floating-point number expressed using 10 digits with 2 digits reserved for the exponent can represent a largest value of 9.9999999e+50 and a smallest value of 0.0000001e−49, considering, for simplicity, unsigned floating-point numbers. For signed floating-point numbers the smallest value would be −9.9999999e+50.

Sometimes, looking at the numbers of identical width, integer representation can be more accurate than floating-point representation since mantissa itself loses some of the bits to the exponent. However, the higher is the algorithm's dynamic range, the better is floating-point vs fixed-point. In general, floating-point representation can provide greater accuracy because, with a fixed number of digits, numbers of different orders of magnitude can be represented. On the other hand, a fixed-point processing implementation is often associated with lower cost and power consumption because fixed-point representation may use integer hardware operations controlled by a software implementation prescribing a specific convention about the location of the binary or decimal point, for example, 6 bits or digits from the right. The hardware to manipulate these representations is less costly than floating-point, and it can be used to perform normal integer operations as well. Therefore, it is often advantageous to use fixed-point FFTs. However, it is not always possible to use fixed-point FFTs because it is difficult to adequately control their stage growth, described in greater detail in the following section.

Stage Growth of Fixed-Point FFTs

An output signal from each of the consecutive stages of an FFT algorithm may be larger than an input signal provided to that stage as a result of performing the computations of the stage. Factors by which an input signal may grow in each stage differ depending on the type of the input signal. For example, a delta function input signal will experience no growth at all, a random input signal may grow by a factor of sqrt(2) every radix-2 stage, while a complex exponential, e.g. sinusoidal, input signal may grow by a factor of 2 every radix-2 stage. In other words, FFTs can grow from as much as more than 1 bit per radix-2 stage, for a complex exponential type of input, to as little as no growth at all, for a delta function input. On average, however, the growth is 0.5 bits per radix-2 stage.

Such growth is a well-known problem with fixed-point FFTs where, as previously described, no matter how large or small a number to be represented is, it can only use the same predefined number of bits for each of the integer and the fractional portions. Growth at each stage may result in overflows, i.e. situations where a calculation produces a result that is greater in magnitude than that which a predefined fixed-point implementation can store or represent. In case of an overflow, a given memory element stores or represents the largest value that it can store or represent, a condition called "saturation." In other words, the computation result is clipped to the maximum value.

Since overflow results in that a computation result cannot be correctly represented, typically, fixed-point FFT algorithms try to avoid or significantly limit the overflows. One way to avoid overflows is to apply a scaling factor after some or all stages of an FFT algorithm. Until now, various schemes for scaling back the outputs of various FFT stages have been used, all suffering from different drawbacks.

The most robust scaling approach is to scale the output down by 1 bit every radix-2 stage. An example for a 6-stage 64-point FFT is shown in FIG. 2, where each of the boxes indicated as ">>1" represents scaling down by a factor of 2.

As is well-known, computers typically implement binary multipliers, i.e. multiplication is carried out by representing numbers in base 2 form, where multiplication of any two numbers is reduced to just shifting and adding bits. For example, a growth (gain) or scaling down by a factor of 2 means shifting by one bit in the correct direction. For example, a growth by a factor of 2 from e.g. a value of 3 ("11" in binary representation) to a value of 6 ("110" in binary representation) is expressed as shifting "11" (i.e., the value of 3) left by one bit, to arrive at 110 (i.e., the value of 6). Similarly, scaling down by a factor of 2 from e.g. a value of 6 to a value of 3 is expressed as shifting "110" right by one bit, to arrive at "011." It is this right shift by one bit that is shown with the ">>1" boxes in FIG. 2, representing scaling down by a factor of 2 (i.e. multiplying the signal by ½).

Figure 2:
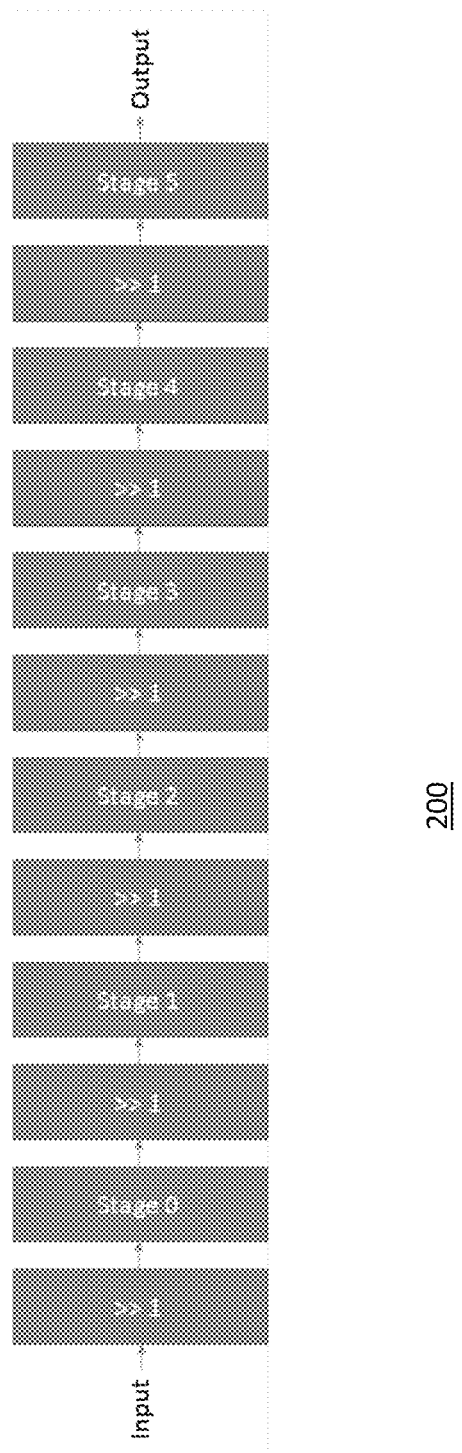
FIG. 2 illustrates scaling for an exemplary 6-stage radix-2 FFT algorithm, according to prior art.

Scaling as illustrated in FIG. 2 allows avoiding overflow in most of the scenarios (as noted above, bit growth in a single stage can exceed 1 bit, but this is rare enough).

However, since an average growth is only 0.5 bits per radix-2 stage, for an average input, this type of scaling needlessly loses some bits of resolution. For the case with 6 stages illustrates in FIG. 2, three bits (i.e. 6 stages times 0.5 bits per stage) of resolution may be lost needlessly. Therefore, improved scaling methods for scaling fixed-point FFTs are needed in order to make those FFTs commercially viable.

Proposed Improved Scaling of Fixed-Point FFTs

Embodiments of the present disclosure are based on scaling, e.g. by multiplying, an output of every pair of consecutive butterfly stages of a fixed-point FFT implemented in a radar or a sonar receiver by a scaling factor equal to two times of the inverse of a growth factor for the pair of consecutive butterfly stages for the FFT algorithm for a purely complex exponential input signal and not taking any further actions trying to prevent overflow. In other words, an output of every other radix-2 stage is scaled down by 2 (i.e. the output is effectively multiplied by ½) or an output of every radix-4 stage is scaled down by 2, which is effectively the same as scaling down by 2 every other radix-2 stage. Besides this scaling, input signals are allowed to overflow by saturation. Simulation results have surprisingly and unexpectedly revealed that, for radar and sonar receivers implementing fixed-point FFTs, this scaling results in adequate performance for any types of input signals, from random to substantially complex exponential or sinusoidal signals.

Such scaling approach may seem appropriate for input signals that appear random in their frequency compositions, e.g. signals used in broadband communication systems. However, for persons of ordinary skill in the art it would be counter-intuitive to use this scaling approach for largely complex exponential or sinusoidal signals, e.g. baseband, typically single frequency signals as typically detected in radar and sonar applications, because, as explained below, this approach is likely to result in overflow and, therefore, significantly reduced signal to noise ratio (SNR), an outcome that engineers usually try to avoid. In contrast to this conventional line of thinking, the present disclosure is based on recognition that such scaling may achieve a balance between having an SNR value that is possible to obtain for a particular input signal and an SNR value that is needed to successfully process such a signal for any type of input signals that could be handled by radar or sonar receivers.

One distinctive feature of radio and sonar applications, is that, at each point in time, a signal reflected from an object is a baseband signal, typically a single frequency signal. Such a reflected signal can be represented as a complex exponential (e.g. sinusoidal) waveform of a particular frequency. Such clean core radar and sonar signals are typically degraded by a broadband noise, i.e. noise of a wide range, or band, of frequencies.

In contrast, oftentimes signals used in other applications, such as e.g. signals used for encoding data in multicarrier systems such as e.g. Orthogonal Frequency Division Multiplexing (OFDM), are broadband signals, i.e. signals that have a wide range of frequencies and, therefore, appear random from the perspective of their frequency representation.

Another distinctive feature of radio and sonar applications, is that they only require accurate determination of presence or absence of a peak in an FFT output. As long as a peak may be accurately identified, the exact magnitude of the peak is not that important. This feature makes radar and sonar applications different from generic applications with sinusoidal/complex exponential signals and this is what makes scaling approach described herein suitable for radar and sonar applications.

In the following, embodiments of the present disclosure are explained with reference to radar receivers implementing radix-2 FFT algorithm. However, these embodiments are equally applicable to sonar receivers. Furthermore, both for radar and sonar applications, based on the description provided herein, a person of ordinary skill in the art will easily be able to extend these embodiments, possibly with minor modifications that would be known to such a person, to other types of fixed-point FFT implementations, such as e.g. radix-4 and other algorithms. All of these embodiments and implementations are, therefore, within the scope of the present disclosure.

Figure 3:
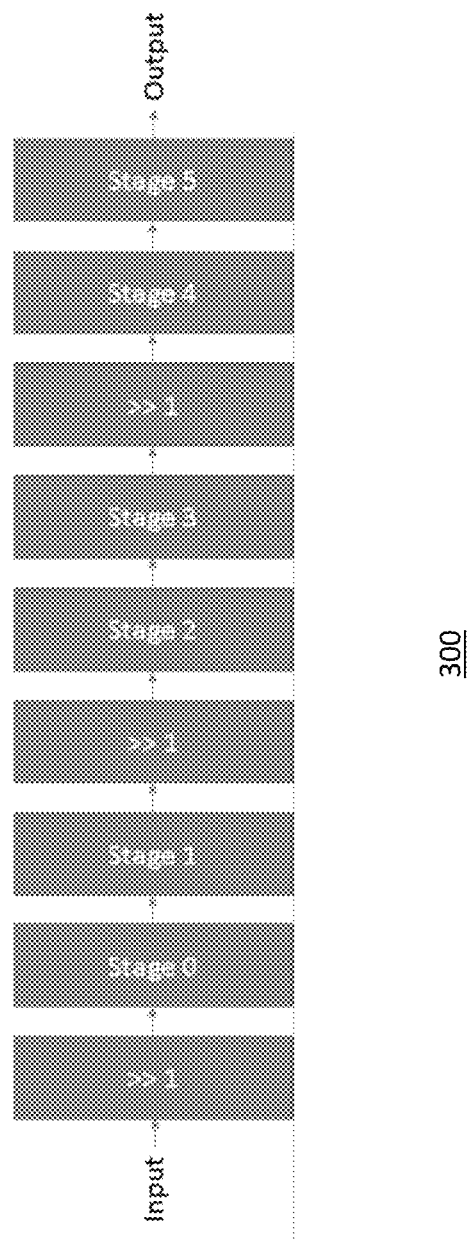
FIG. 3 illustrates scaling for an exemplary 6-stage radix-2 FFT algorithm, according to some embodiments of the disclosure.

FIG. 3 illustrates scaling for an exemplary 6-stage radix-2 FFT algorithm, according to some embodiments of the disclosure. In other embodiments, any other number of stages may be employed.

As shown in FIG. 3, the proposed scaling includes scaling by 1 bit every other radix-2 stage (amounting to scaling by 0.5 bits every radix-2 stage). The inventor of the present disclosure recognized that such scaling is suitable for fixed-point FFTs that would be implemented in radio and sonar applications, where the core clean signal to be detected by a receiver is a complex exponential (e.g. a sinusoidal), which may then be degraded by a broadband noise, and where the required precision grows as the noise increases. Such scaling results in an adequate SNR for any type of input signals which may need to be processed by radar or sonar receivers, ranging from highly random input signals to substantially complex exponential input signals, and including input signals which are somewhere between the highly random and the largely complex exponential input signals.

A highly random input signal (i.e. a signal comprising many different frequencies) provided to an FFT algorithm of a data processing system of a radar receiver implies that the received radar signal is very noisy. For a radix-2 FFT, a highly random input signal grows by a factor of sqrt(2) every stage. Therefore, the signal grows by a factor of 2 (i.e. sqrt(2)×sqrt(2)) every other radix-2 stage. With such growth, scaling the signal by a factor of 2 every other radix-2 stage typically will not result in overflow because such scaling will provide sufficient compensation for the growth. As previously described, overflow results in that a computation result cannot be correctly represented, which degrades the received signal. Not having an overflow means that the received radar signal is not degraded further by adding noise due to overflow, thus increasing the SNR when compared to a conservative conventional approach of scaling every stage, which is exactly what is needed for successful processing of highly random signals.

A purely complex exponential input signal (i.e. a signal comprising a single frequency) provided to an FFT algorithm of a radar receiver implies that the received radar signal is very clean and noise-free. For a radix-2 FFT, a purely complex exponential input signal grows by a factor of 2 every radix-2 stage. Therefore, the signal grows by a factor of 4 (i.e., 2×2) every other radix-2 stage. With such growth, scaling the signal by a factor of 2 every other radix-2 stage will likely result in overflow by saturation because it will not compensate for the growth of 4 every other radix-2 stage, increasing the noise and reducing SNR. Such a reduced SNR is, however, acceptable in a radar receiver because, since the received reflected radar signal was very clean and noise-free to begin with, high SNR is not required to identify a peak in the FFT output. As previously described herein, once a peak on an output of an FFT is identified, distance to an object, location of an object, and/or velocity of an object may be determined based on the x- and y-axis coordinates of the peak in the two-dimensional array of FFT bins. In case velocities do not need to be determined, it is sufficient to generate only a one-dimensional array by only applying horizontal FFTs.

An input signal that is somewhere between a purely complex exponential waveform and a highly random signal implies that the received radar signal is not quite clean and noise-free, but degraded by broadband noise. The closer such a signal is to a random signal, the more noise there is. For a radix-2 FFT, such an input signal would grow by a factor that is between sqrt(2) and 2 every radix-2 stage. Therefore, the signal grows by a factor between 2 and 4 every other radix-2 stage. The scaling proposed herein will naturally achieve a balance between the amount of noise due to overflow by saturation and the cleanliness of the input signal, the latter, in turn, dictating the SNR necessary to successfully process such a received signal by a radar receiver:

received signals that are not purely complex exponential but include relatively little noise (i.e. signals only having a relatively small contribution of random signal) will have a growth factor per radix-2 stage that is closer to 2 than to sqrt(2) and, therefore, may overflow by saturation resulting in more noise being added (i.e. decreased SNR), which is acceptable because such signals were relatively clean to begin with and, therefore, do not require high SNR to be successfully processed, received signals that are not purely random but do include relatively large noise components (i.e. signals having a relatively large contribution of random signal) will have a growth factor per radix-2 stage closer to sqrt(2) than to 2 and, therefore, are less likely to overflow by saturation resulting in less noise being added (i.e. increased SNR), which is advantageous because such signals need the increased SNR to be successfully processed.

For a radix-4 FFT algorithm, growth at each radix-4 stage is a factor of 4 for purely complex exponential input signals and a factor of 2 for random input signals. Therefore, corresponding scaling for a radix-4 FFT would be scaling twice as much as for radix-2, described above.

In some embodiments, it may be important to ensure that when the overflow does occur, the signal is saturated at its max or min level, rather than letting it "wrap around". Mild saturation is equivalent to adding some noise to a signal, while full wrap around degrades the signal by the maximum possible value. A data processing system configured to carry out methods described herein, such as e.g. the system shown in FIG. 18 or 19, could be configured to ensure, in the math operation (in this case, the operation being add/subtract) that the signal is saturated instead of wrapped around.

In contrast to prior art FFT scaling approaches which try to eliminate or at least limit the overflow by saturation or make the overflow less likely, the above-described scaling purposefully allows the overflow to occur. Such scaling decreases the FFT precision for a pure clean complex exponential input where the requirements for a "good enough" precision are not as high, while providing a progressively improved FFT precision as the signal becomes noisier. A section below provides simulation results for applying the proposed scaling to various input signals that could be provided to a data processing system for processing signals detected by a radar or a sonar receiver.

Simulation Results

Even in the worst case scenario of a clean complex exponential input signal at near saturation, the scaling method described herein still allows detecting the fundamental frequency of the received reflected radar signal, in spite of the clipping. FIGS. 4-16 provide simulation results for an exemplary signed fixed-point 16-bit integer FFT configured to saturate at the value of 32,767. The value of 32,767, referred to in the following as "32K," is the maximum value that may be represented by the fixed-point FFT implementation of this example because this is the maximum possible value of a signed 16-bit integer. In other words, 16-bit integer, saturated, rather than wrapped around, implies positive saturation at 32,767=0x7FFF and negative saturation at −32,768=0x8000.

Figure 4:
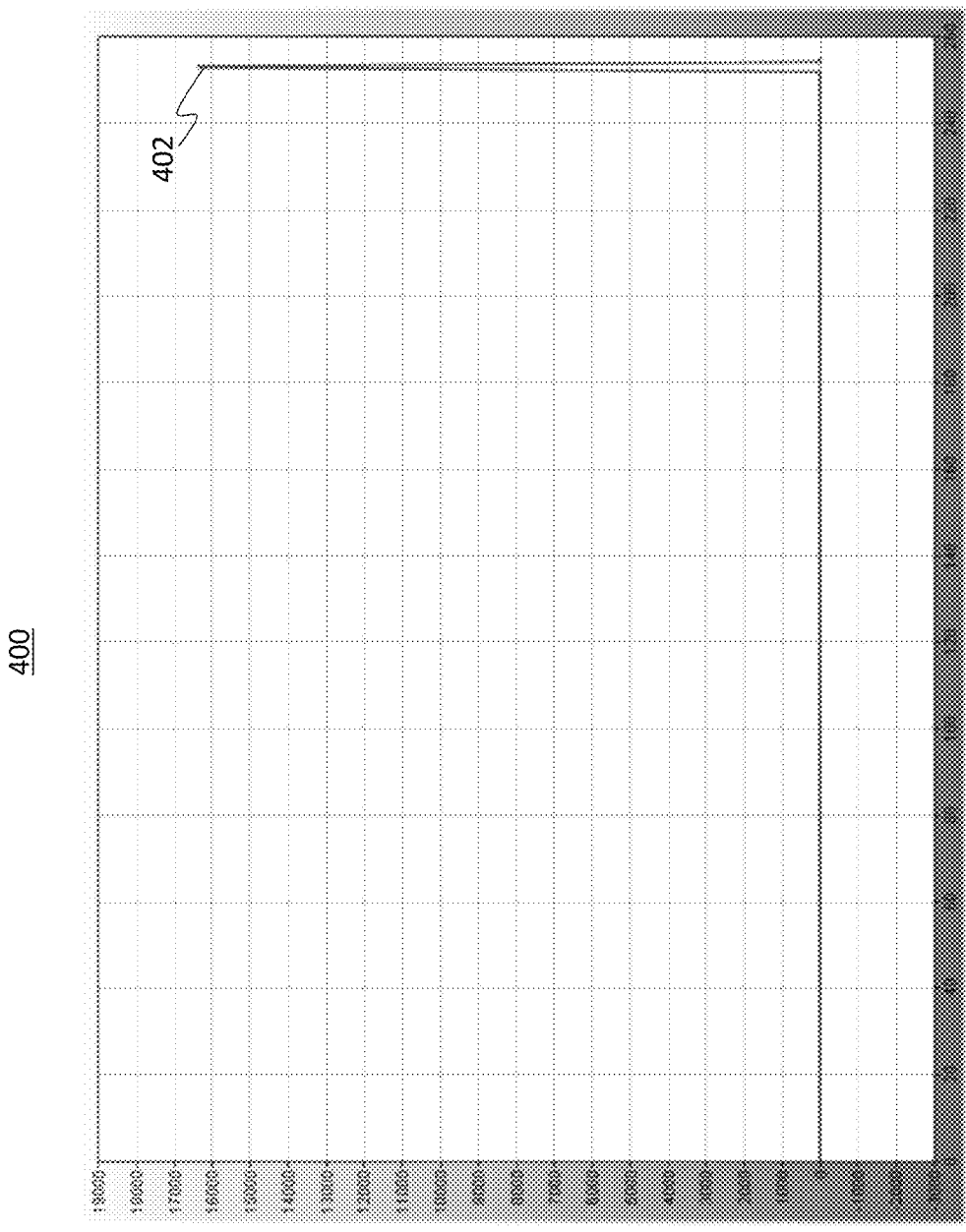
FIG. 4 provides a plot illustrating simulation results for a 256-point FFT of an input signal represented as exp (2π*i*n*3/256) having an amplitude small enough to avoid clipping, according to some embodiments of the disclosure.

FIG. 4 shows a plot 400 of a 256-point FFT of input waveform represented as $\exp(2\pi*i*n*3/256)$ (i.e. there are precisely 3 periods of this exponential in the 256-point FFT window), with the input signal small enough so that there is no clipping of the FFT result. As shown in FIG. 4, the peak value 402 of the FFT is about 16K, sufficiently low to avoid clipping which would occur at about 32K.

Figure 5:
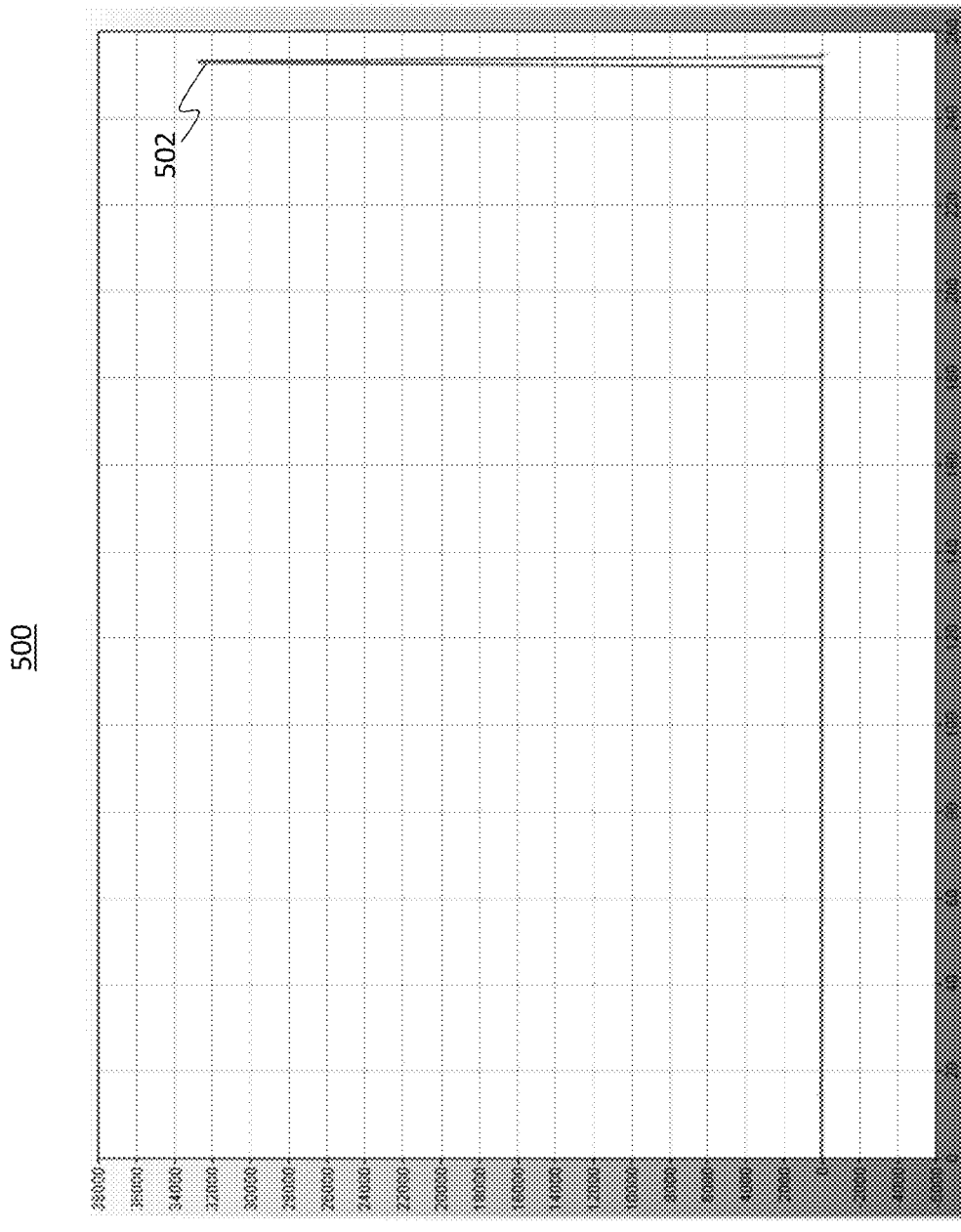
FIG. 5 provides a plot illustrating simulation results for a 256-point FFT of an input waveform as in FIG. 4 but having an amplitude that is 4 times greater than that of the input signal of FIG. 4, according to some embodiments of the disclosure.

FIG. 5 shows a plot 500 for the same input waveform as in FIG. 4 but having an amplitude that is 4 times higher than that shown in FIG. 4, such amplitude being high enough to significantly clip to the maximum value that may be represented by the fixed-point FFT of this example. As can be seen in FIG. 5, despite the fact that the FFT peak 502 is clipped at the maximum possible value of about 32K while the correct value would have been around 64K, there is virtually no degradation in the computed relative spectrum as indicated on the horizontal axis of the FIGURE.

Figure 6:
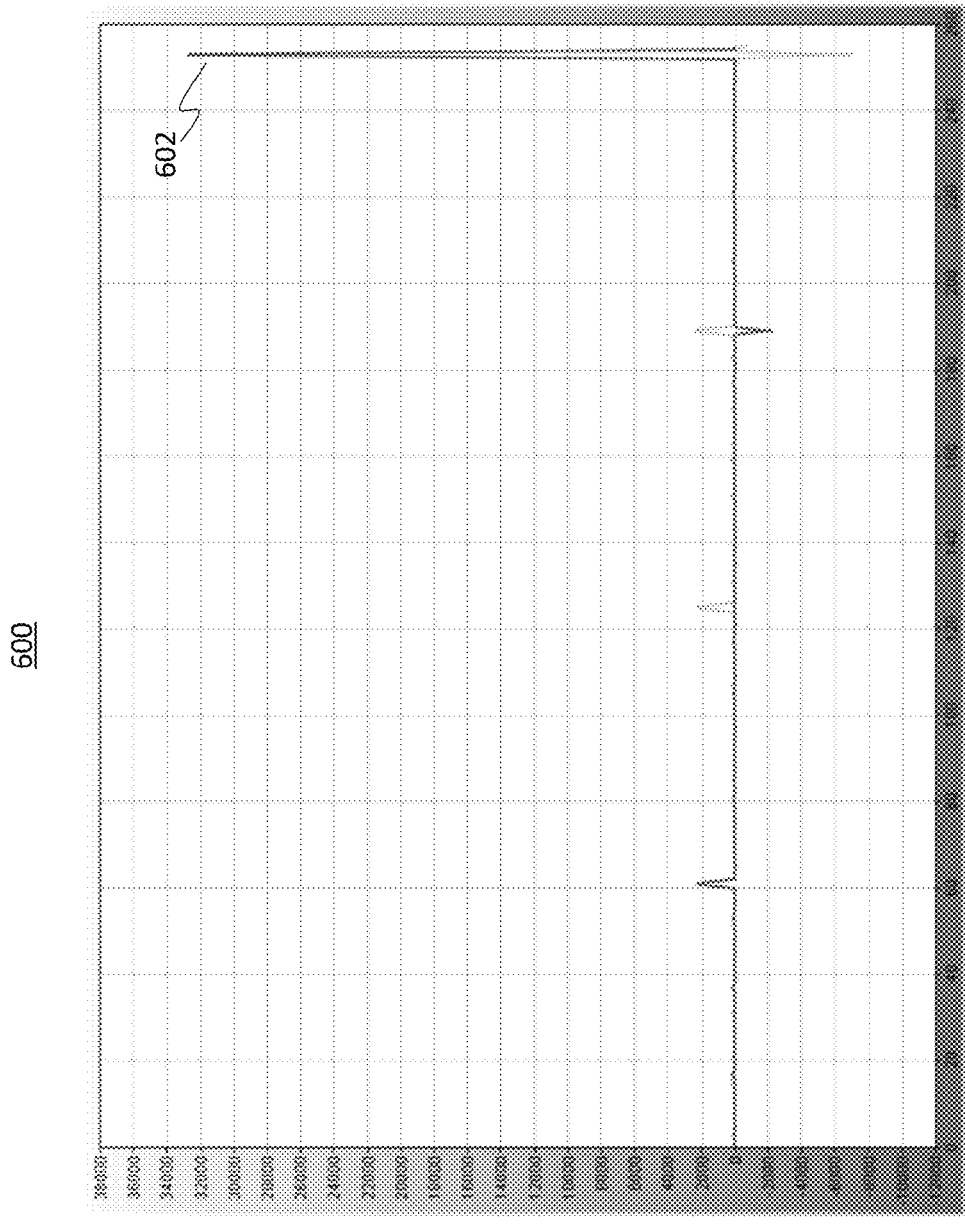
FIG. 6 provides a plot illustrating simulation results for a 256-point FFT of an input waveform as in FIG. 4 but having an amplitude that is 8 times greater than that of the input signal of FIG. 4, according to some embodiments of the disclosure.

FIG. 6 shows a plot 600 for the same input signal as in FIG. 4, but at 8× its amplitude, causing clipping of the peak 602. In the example of FIG. 6, clipping of the peak 602 is rather significant because the fundamental bin's theoretical value of about 128K is clipped to the maximum FFT value of 32K. In this case, there is a noticeable distortion of the output, as can be seen in FIG. 6 with smaller peaks besides the peak 602, however the fundamental bin of the FFT (i.e. the peak 602) is still very clearly pronounced and correct, allowing successful processing of the received signal.

Figure 7:
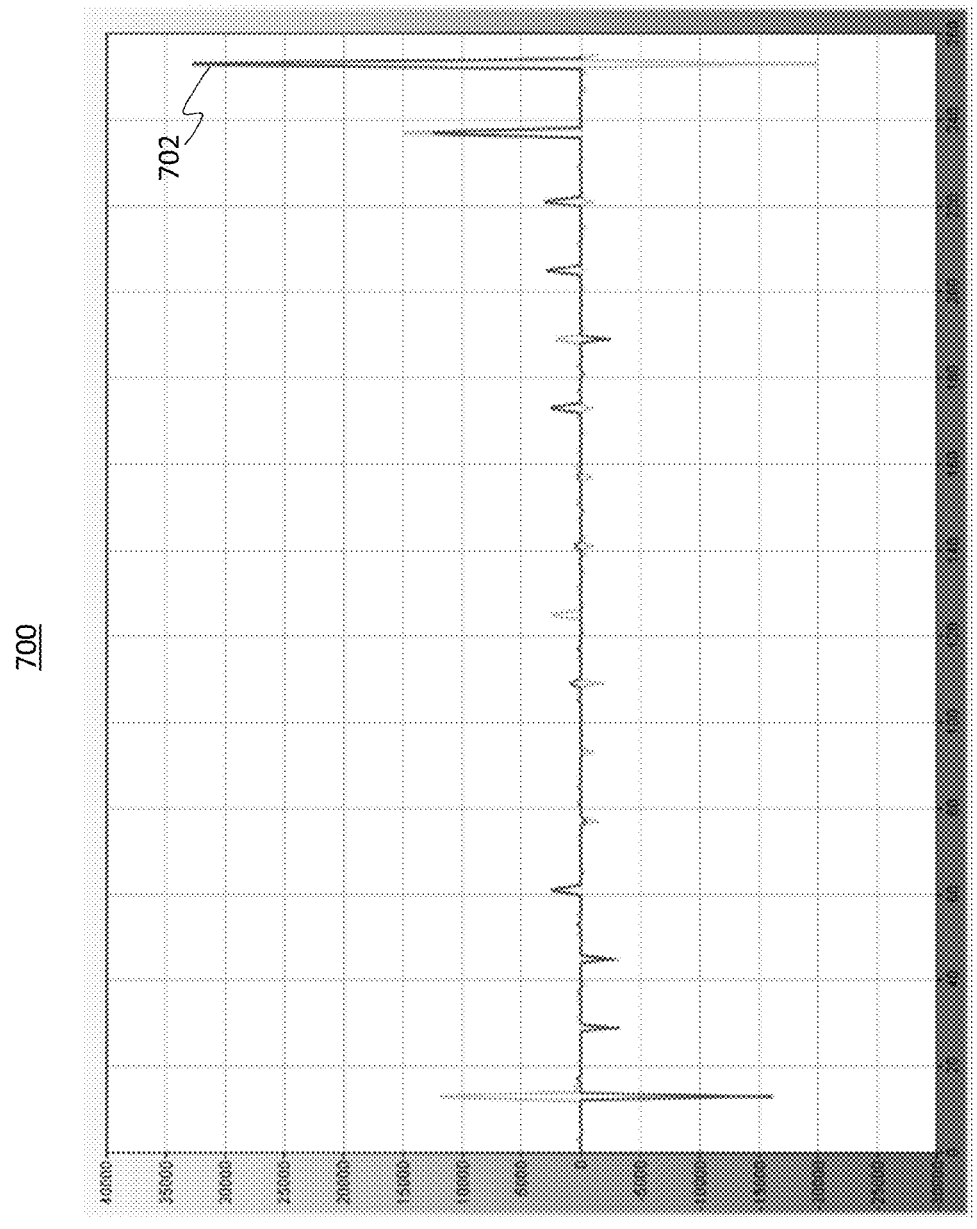
FIG. 7 provides a plot illustrating simulation results for a 256-point FFT of an input waveform as in FIG. 4 but having an amplitude that is 16 times greater than that of the input signal of FIG. 4, according to some embodiments of the disclosure.

FIG. 7 shows a plot 700 for the same input signal as in FIG. 4, but this time at 16× its amplitude. In this case, the peak-to-peak magnitude of the input signal is 32K, half of the input's full dynamic range, causing clipping in almost every stage of the FFT. As can be seen in FIG. 7 with smaller peaks besides the fundamental peak 702, there is now large distortion of the output, however the fundamental bin 702 is still very clearly pronounced and correct. Clipping of the example of FIG. 7 is very significant because the fundamental bin's theoretical value should have been 256K and it has been clipped at 32K. In other words, a mathematically correct output is 8× over the dynamic range.

Figure 8:
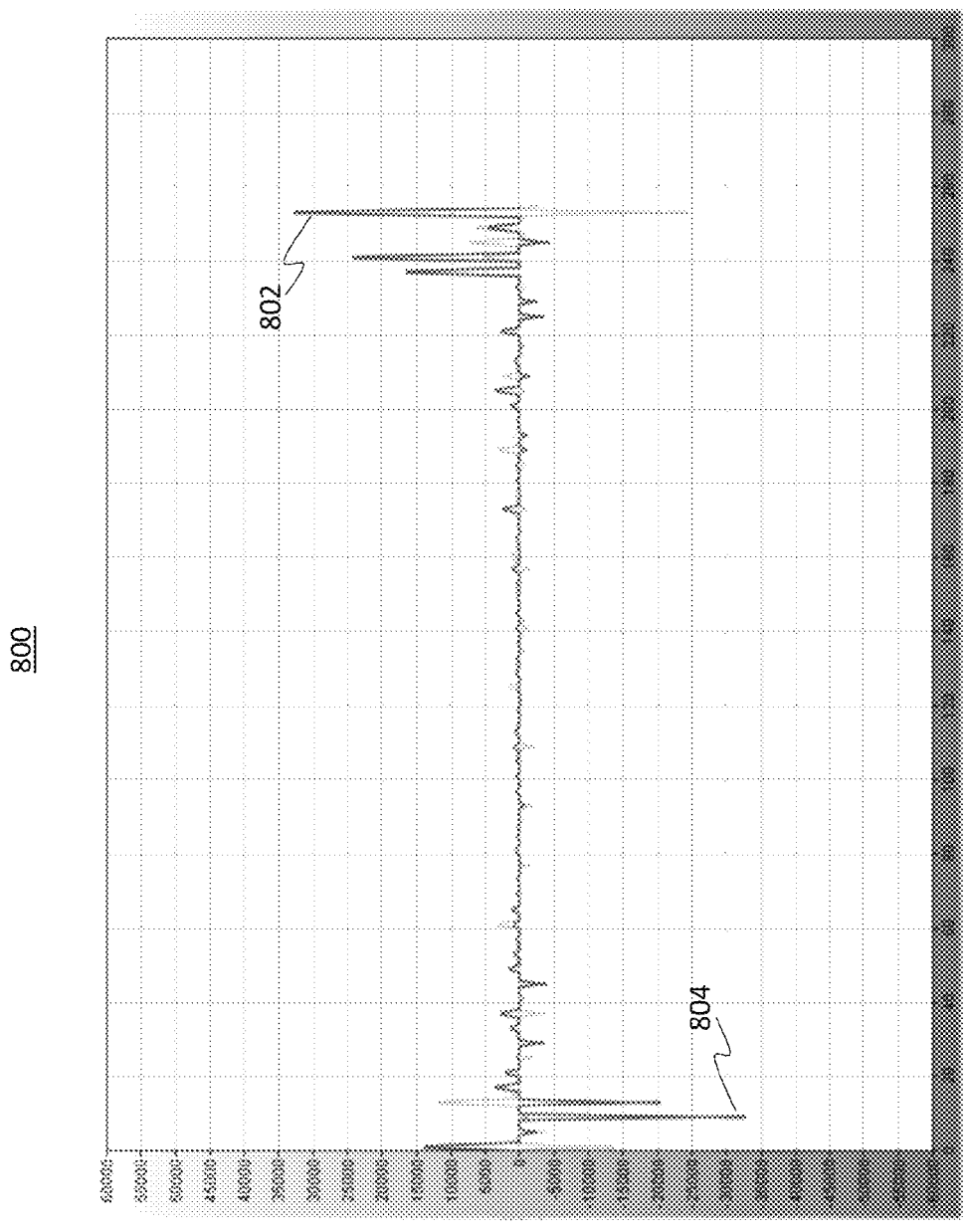
FIG. 8 provides a plot illustrating simulation results for a 256-point FFT of an input waveform as in FIG. 4 but having an amplitude that is 511/16 times greater than that of the input signal of FIG. 4, according to some embodiments of the disclosure.

FIG. 8 shows a plot 800 for the same input signal as in FIG. 4, but at 511/16 times the amplitude of the input signal of FIG. 4. This may represent a situation that is as close to the full saturation as is possible to get with this FFT because 512/16=32, and the input signal would have been clipped before the FFT even starts. Such a scenario causes clipping in every stage of the FFT as shown in FIG. 8 with smaller peaks besides the fundamental peak 802. As can be seen in FIG. 8, even in this extreme case, the fundamental bin is, amazingly, still correct, but now there is another fundamental bin candidate 804 and it is not clear which one to choose. However, for practical implementations, this scenario is not likely to happen because radar systems are typically designed to not saturate in data collected (i.e. before the mathematical operations of the FFT even begin) even accounting for noise together with the complex exponential of the expected core radio signal.

Figure 9:
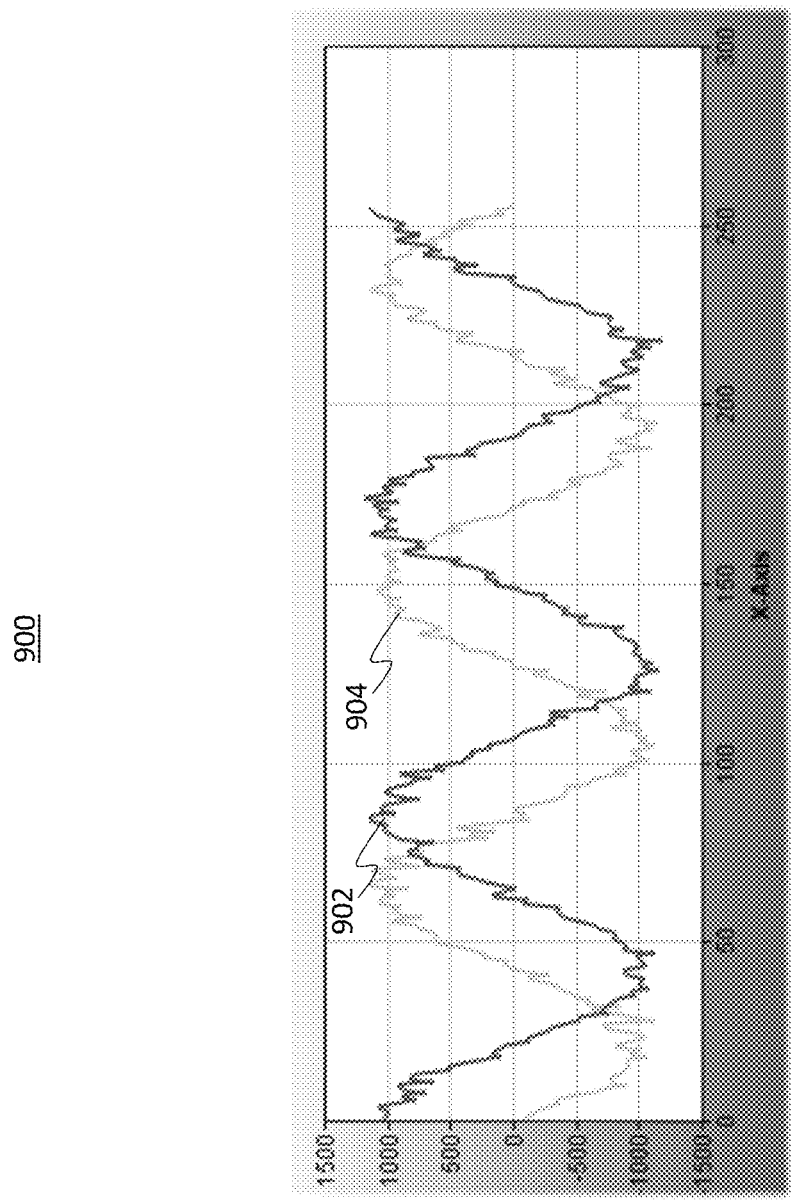
FIG. 9 provides a plot illustrating real and imaginary parts of an input signal of FIG. 4 but with added noise, according to some embodiments of the disclosure.

Now consider what happens when noise is added while ensuring that the input signal is not clipped before the FFT even starts. FIG. 9 illustrates a plot 900 illustrating real and imaginary parts of an input signal of FIG. 4 (i.e. amplitude is small enough so that no clipping occurs) but with added noise. In FIG. 9, curve 902 represents the real part of such a noisy complex input signal, while curve 904 represents the imaginary part.

Figure 10:
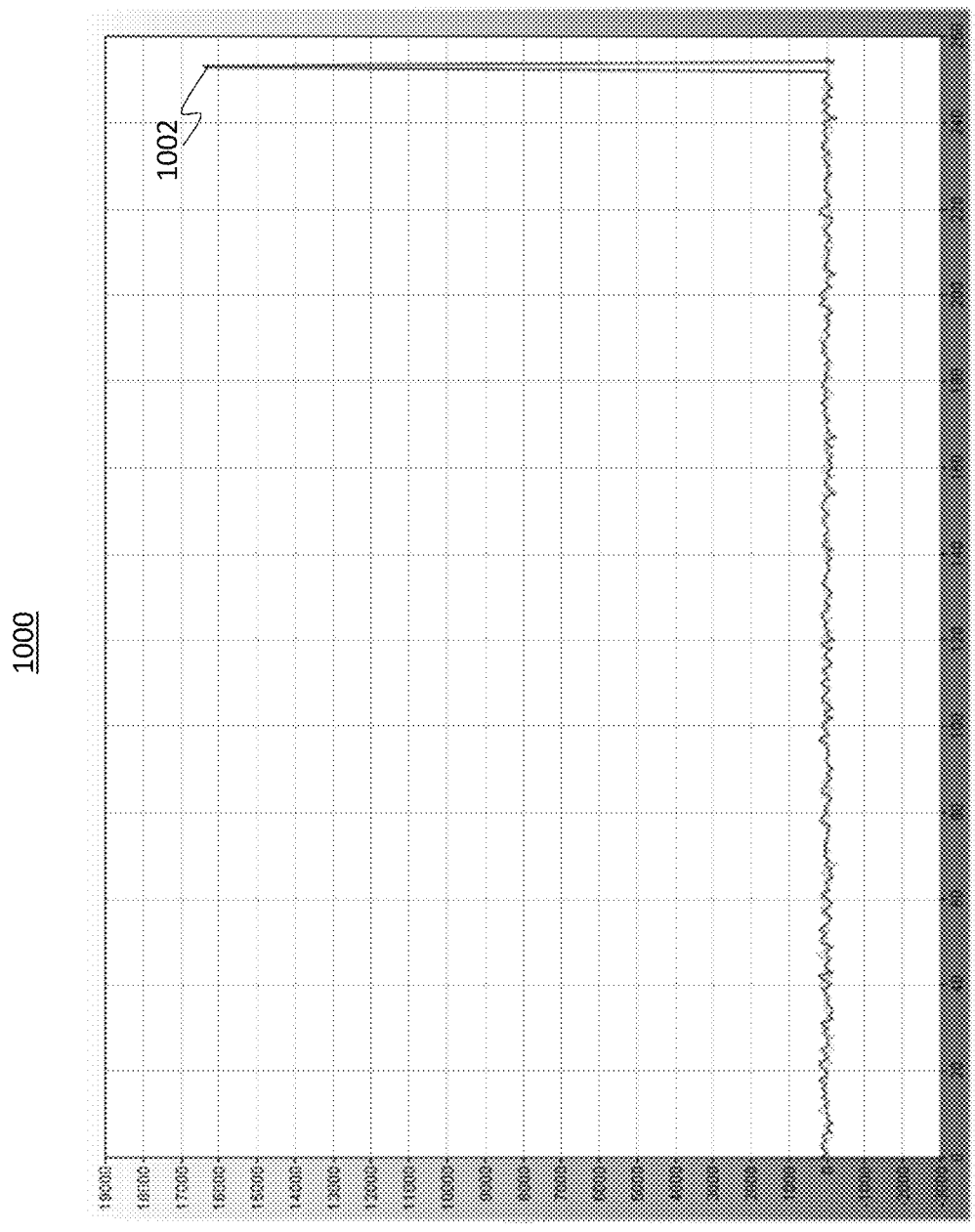
FIG. 10 provides a plot illustrating simulation results for a 256-point FFT of an input signal shown in FIG. 9, according to some embodiments of the disclosure.

FIG. 10 shows a plot 1000 for an FFT of the input signal shown in FIG. 9. As can be seen from FIG. 10, no clipping occurs during the FFT processing, the FFT peak 1002 is at about 16K.

Figure 11:
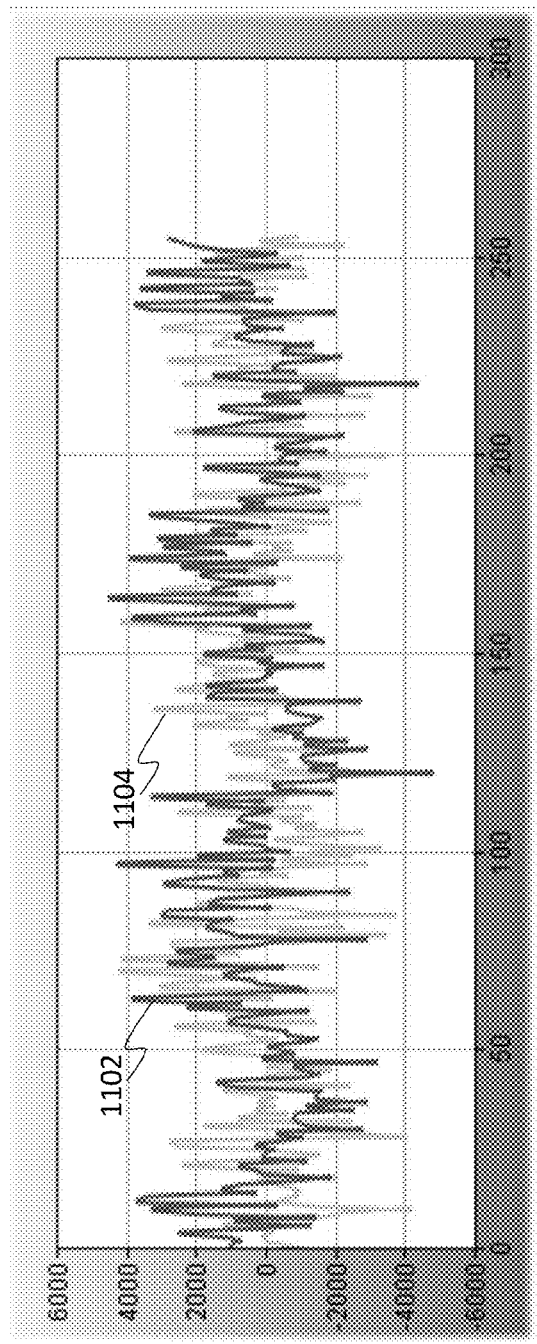
FIG. 11 provides a plot illustrating real and imaginary parts of an input signal of FIG. 4 but with significantly more noise, according to some embodiments of the disclosure.

FIG. 11 shows a plot 1100 for the same complex exponential core signal as in the input signal of FIG. 4 but with much more noise, i.e. with significantly more noise than shown for the signal of FIG. 9. In FIG. 11, curve 1102 represents the real part of such a noisy complex input signal, while curve 1104 represents the imaginary part.

Figure 12:
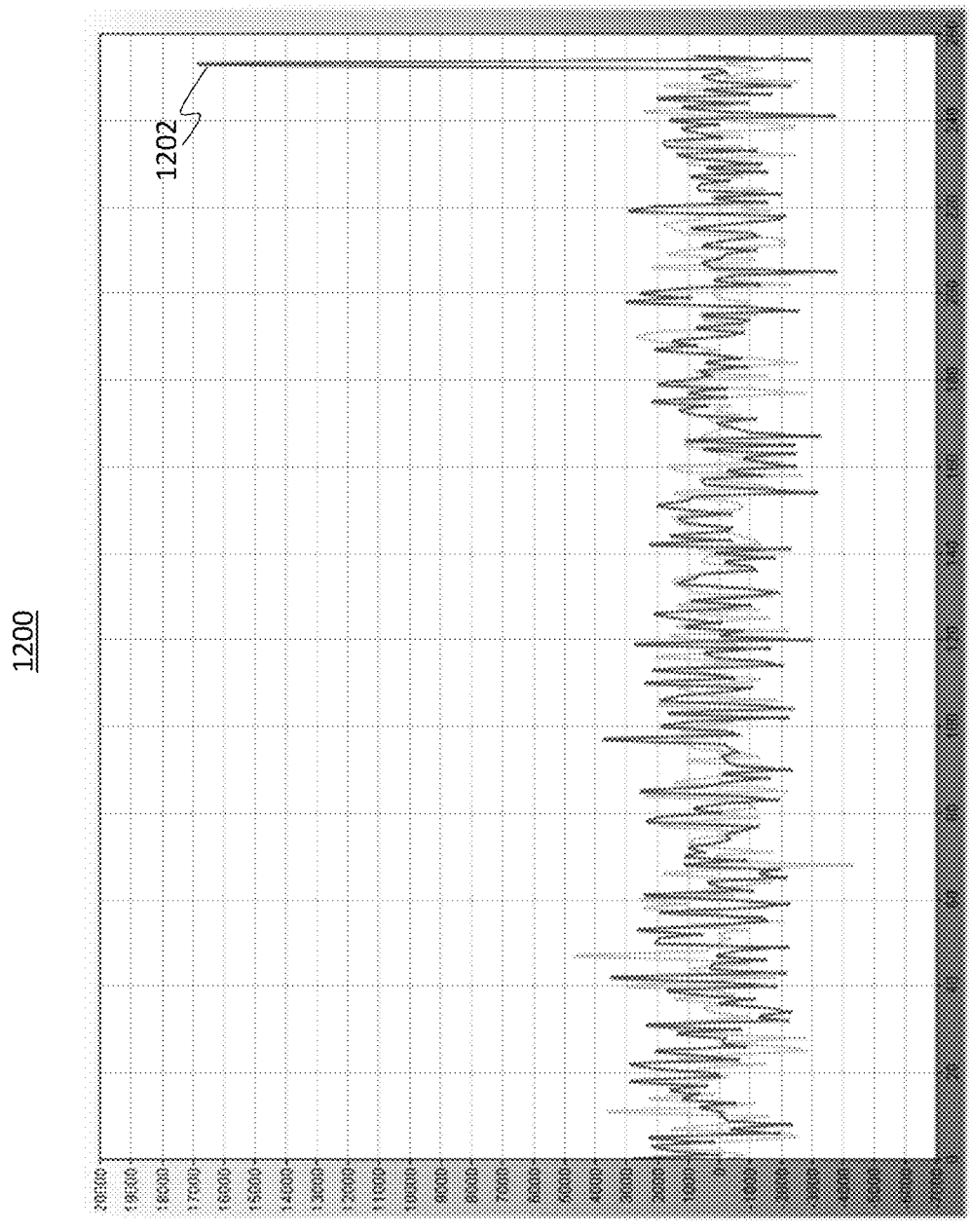
FIG. 12 provides a plot illustrating simulation results for a 256-point FFT of an input signal shown in FIG. 11, according to some embodiments of the disclosure.

FIG. 12 shows a plot 1200 for an FFT of the input signal shown in FIG. 11. As can be seen from FIG. 12, no clipping of the peak 1202 occurred during the FFT computation, although the overall input magnitude is the same as in the signal that generated FIG. 5 where the FFT did clip.

Figure 13:
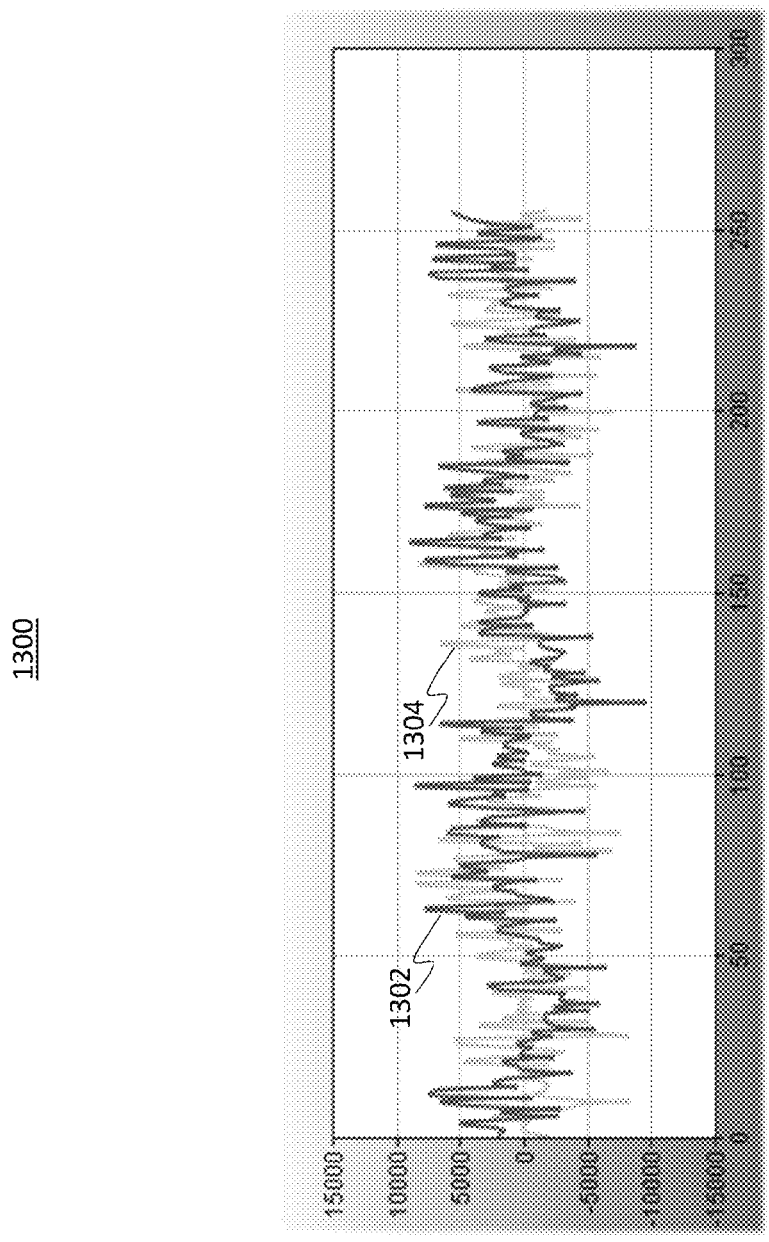
FIG. 13 provides a plot illustrating real and imaginary parts of an input signal increased by a factor of 2 compared to that of FIG. 11, according to some embodiments of the disclosure.
Figure 14:
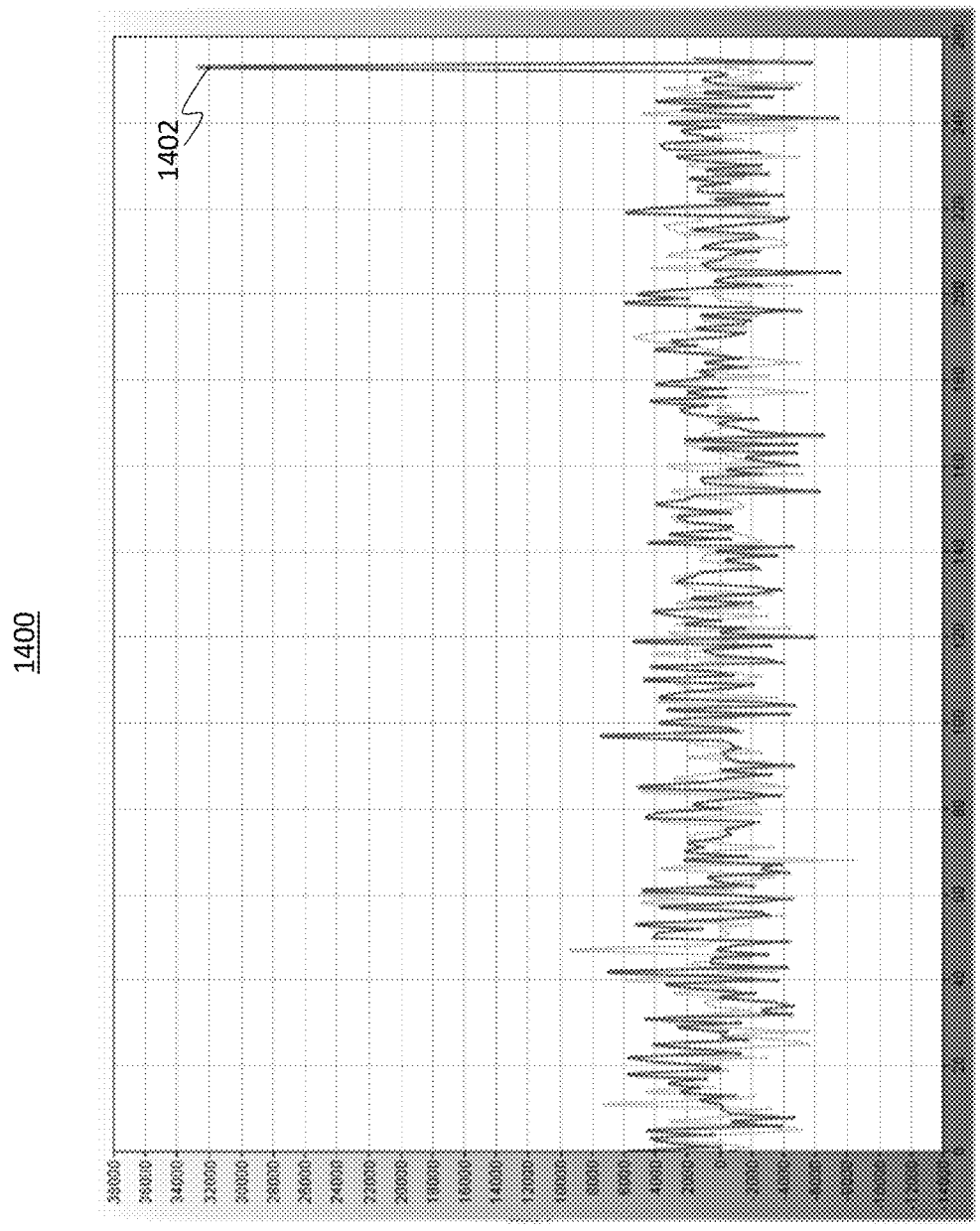
FIG. 14 provides a plot illustrating simulation results for a 256-point FFT of an input signal shown in FIG. 13, according to some embodiments of the disclosure.

Increasing this input by another factor of 2 is shown in FIG. 13, illustrating a plot 1300 of the same waveform as in FIG. 11, but at 2× its magnitude. In FIG. 13, curve 1302 represents the real part of such a noisy complex input signal, while curve 1304 represents the imaginary part. A corresponding FFT is shown in FIG. 14, showing a plot 1400 of the same waveform as in FIG. 12, but at 2× its magnitude. Although, in this scenario, the total peak-to-peak input amplitude is now 16K (i.e. quarter of the full dynamic range), no clipping occurred during the FFT computation at all, and the position of the peak 1402 in the output is perfectly accurate. This is attributable to the fact that much of the input's amplitude is now occupied by noise, whose FFT growth is only 0.5 bits per each radix-2 stage. A pure exponential input of the same magnitude produced the FFT shown in FIG. 5, which did clip, but with clipping having very little effect on the result precisely because its input was "clean."

Figure 15:
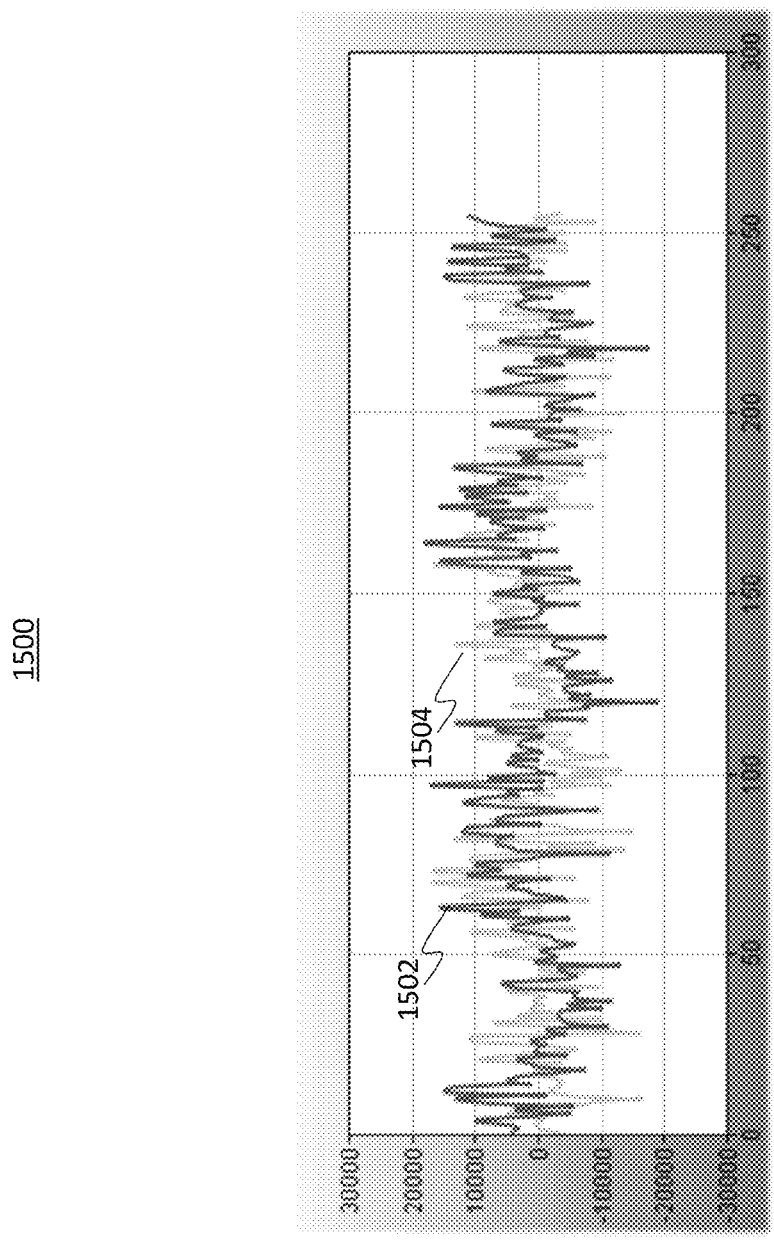
FIG. 15 provides a plot illustrating real and imaginary parts of an input signal increased by a factor of 2 compared to that of FIG. 13, according to some embodiments of the disclosure.
Figure 16:
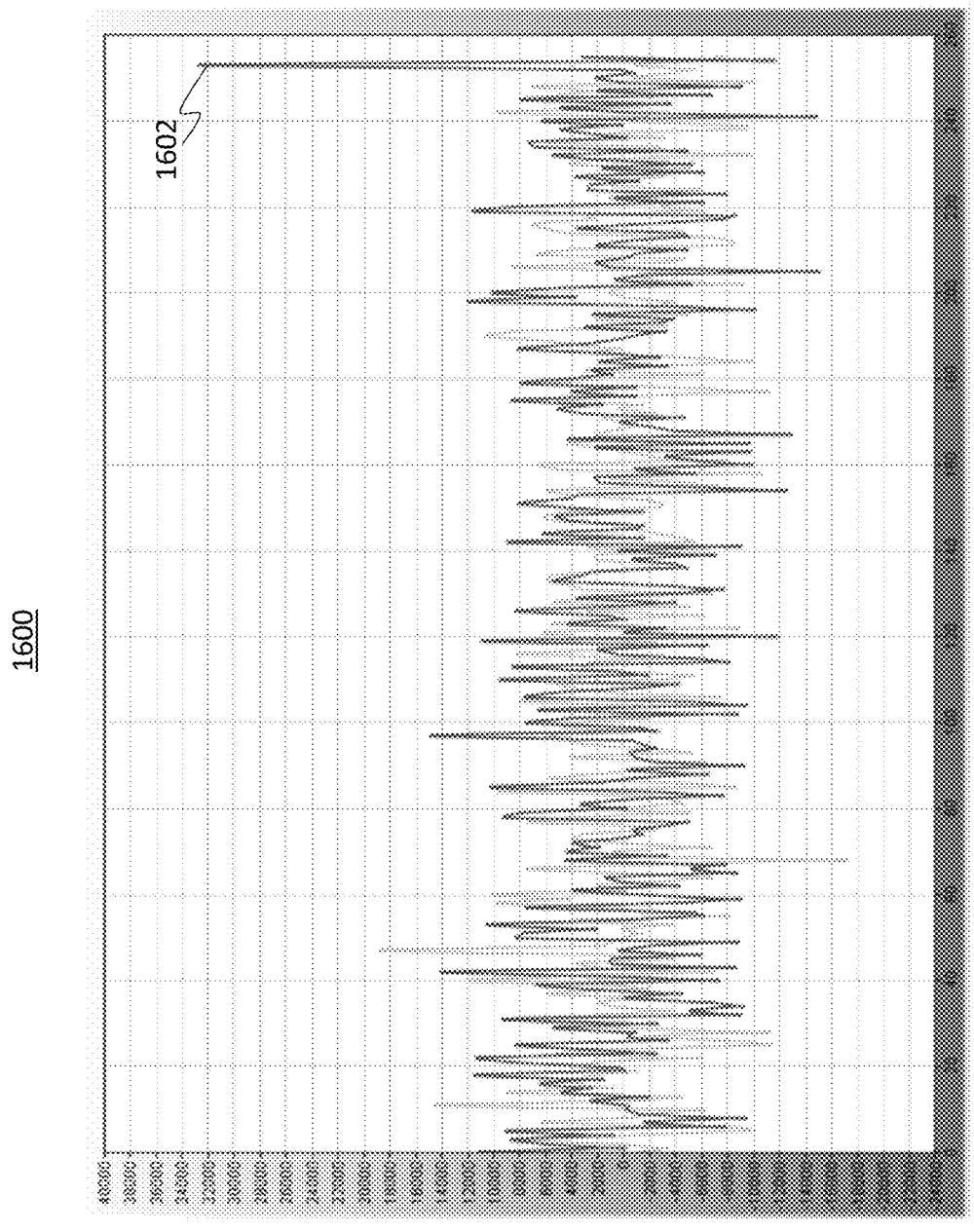
FIG. 16 provides a plot illustrating simulation results for a 256-point FFT of an input signal shown in FIG. 15, according to some embodiments of the disclosure.

Finally, FIG. 15 shows a plot 1500 of a noisy input doubled again in comparison with that of FIG. 13, so that for FIG. 15 the input is half of the total input's dynamic range. In FIG. 15, curve 1502 represents the real part of such a noisy complex input signal, while curve 1504 represents the imaginary part. A corresponding FFT is shown in FIG. 16, showing a plot 1600 of the same waveform as in FIG. 14, but at 2× its magnitude.

Clipping did occur this time—the fundamental's peak 1602 is now saturated at 32,767, whereas, ideally, it should have been 64K. This is the only side effect of the clipping, the rest of the spectrum, when compared with FIG. 14 looks perfect and the fundamental peak is easily distinguishable.

Exemplary Method Utilizing the Improved Scaling of Fixed-Point FFTs

Figure 17:
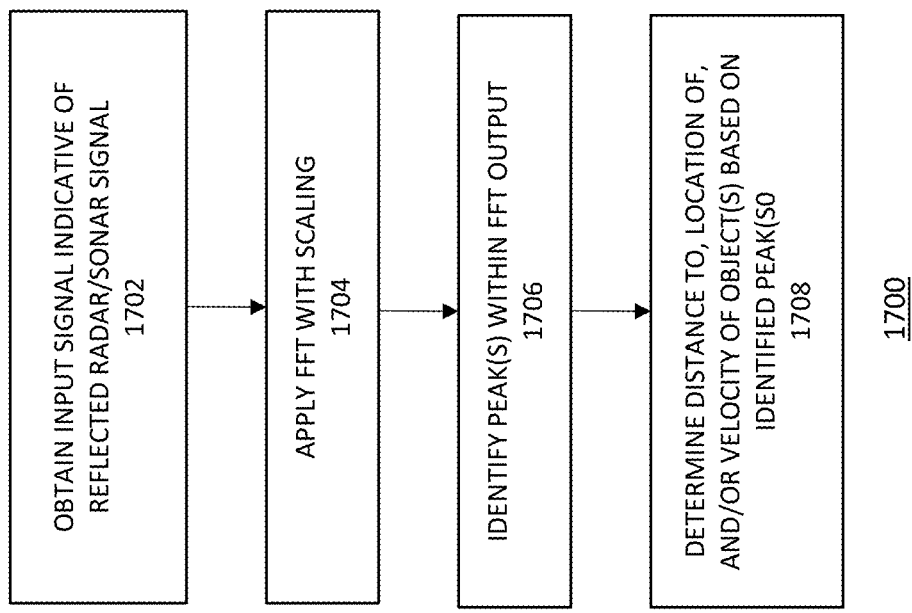
FIG. 17 illustrates an exemplary flow diagram of a method utilizing improved scaling of fixed-point FFTs, according to some embodiments of the disclosure.

FIG. 17 illustrates an exemplary flow diagram 1700 of a method utilizing improved scaling of fixed-point FFTs as described herein. Such a method may be performed by any data processing system comprising at least a processor and a memory, such as e.g. a data processing system 1800 illustrated in FIG. 18. Such a data processing system may be included within or communicatively connected to a radar or a sonar system, in particular a radar or a sonar receiver.

The method 1700 assumes that, first, a radar or a sonar transmitter transmits a signal that is to be reflected by one or more objects of interest and acquired by a radar or a sonar receiver. Such a signal is preferably a chirp signal.

The method 1700 may begin with the data processing system obtaining an input signal indicative of the signal detected by a radar antenna of a radar receiver or a sonar sensor of a sonar receiver (box 1702 in FIG. 17). The detected signal includes a signal transmitted by a radar or a sonar transmitter as reflected from one or more objects of interest. The transmitted signal could be a chirp signal, in which case the detected signal would also comprise a chirp signal. In various embodiments, the data processing system may receive the input signal from e.g. an analog front end of a radar or a sonar receiver configured to receive and possibly pre-process signals acquired by a radio or a sonar receiver. In some embodiments, the analog front end may convert (if desired) acquired analog signals to data samples of the input signal provided to the data processing system.

As illustrated with box 1704 in FIG. 17, the data processing system may then apply FFT with improved scaling as described herein. To that end, the data processing system could e.g. perform steps as described above, i.e. perform horizontal (i.e. range) windowed FFTs on a data rectangle, preferably but not necessarily followed by the vertical (velocity) windowed FFTs. Thus, the data processing system may perform vertical FFTs on the results of the horizontal FFTs, before the peak identification of the following step starts. In implementations where only the range of the detected objects, and not their velocity, is of interest, the data processing system may be configured to carry out the peak identification on the output of the horizontal FFTs. In other words, in such implementations, the data processing system would only perform the horizontal FFTs on the input signal and arrange the results in a one-dimensional array indexing the frequencies, from which a distance to an object could be determined based on the frequency of the peak that was determined to be attributable to that object.

It should be noted that, in case of radix-2 FFT algorithms where an odd number of stages are employed, in some embodiments, the data processing system may be configured to perform the improved scaling as described herein on the pairs of stages and an output of one unpaired, odd, stage may be left unscaled. In other embodiments, the data processing system may be configured to also scale the output of the odd stage by any amount that is determined to be suitable for a particular deployment of such a system.

Once the data processing system obtains the output of applying the FFT, the data processing system is configured to identify zero or more peaks that may be present within the FFT output (box 1706 in FIG. 17). As previously described herein, ways to identify the peaks are known to a person of ordinary skill in the art and any of the known means and algorithms for identifying the peaks are within the scope of the present disclosure.

Based on the identified peak(s) in the FFT output, the data processing system may determine, possibly for each object of interest, one or more of an indication of a distance to an object, an indication of a velocity of an object, an indication of a direction of movement of an object, and an indication of a location of an object, e.g. with respect to the radar/sonar receiver or a transmitter (box 1708 in FIG. 17). To that end, as described herein, the data processing system would determine x- and y-coordinates of the identified peaks to determine information regarding objects location and movement. Various ways to determine distances to, locations of, direction of movement, and/or velocities of objects based on the identified peaks in an FFT output of radar receivers are known in the art and are within the scope of the present disclosure.

Exemplary Data Processing System

Figure 18:
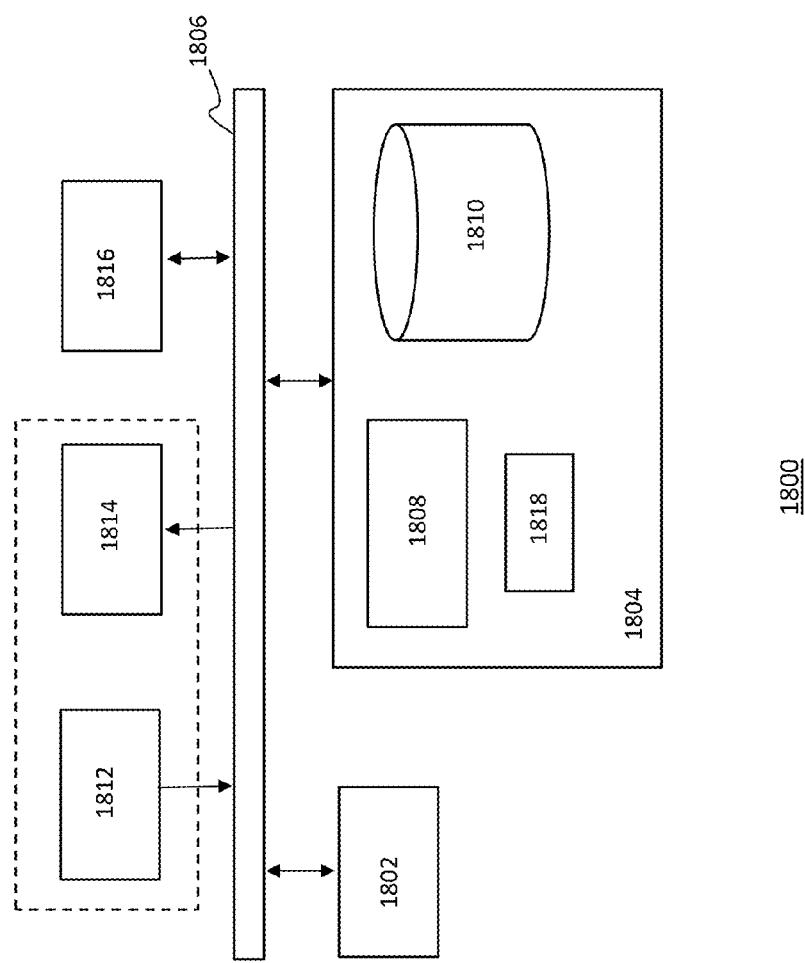
FIG. 18 depicts a block diagram illustrating an exemplary data processing system, according to some embodiments of the disclosure.

FIG. 18 depicts a block diagram illustrating an exemplary data processing system 1800, according to some embodiments of the present disclosure.

As shown in FIG. 18, the data processing system 1800 may include at least one processor 1802 coupled to memory elements 1804 through a system bus 1806. As such, the data processing system may store program code within memory elements 1804. Further, the processor 1802 may execute the program code accessed from the memory elements 1804 via a system bus 1806. In one aspect, the data processing system may be implemented as a computer that is suitable for storing and/or executing program code. It should be appreciated, however, that the data processing system 1800 may be implemented in the form of any system including a processor and a memory that is capable of performing the functions described within this disclosure.

The memory elements 1804 may include one or more physical memory devices such as, for example, local memory 1808 and one or more bulk storage devices 1810. The local memory may refer to random access memory or other non-persistent memory device(s) generally used during actual execution of the program code. A bulk storage device may be implemented as a hard drive or other persistent data storage device. The processing system 1800 may also include one or more cache memories (not shown) that provide temporary storage of at least some program code in order to reduce the number of times program code must be retrieved from the bulk storage device 1810 during execution.

Input/output (I/O) devices depicted as an input device 1812 and an output device 1814, optionally, can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 18 with a dashed line surrounding the input device 1812 and the output device 1814). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 1816 may also, optionally, be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 1800, and a data transmitter for transmitting data from the data processing system 1800 to said systems, devices and/or networks. Modems, cable modems, and Ethernet cards are examples of different types of network adapter that may be used with the data processing system 1800.

As pictured in FIG. 18, the memory elements 1804 may store an application 1818. In various embodiments, the application 1818 may be stored in the local memory 1808, the one or more bulk storage devices 1810, or apart from the local memory and the bulk storage devices. It should be appreciated that the data processing system 1800 may further execute an operating system (not shown in FIG. 18) that can facilitate execution of the application 1818. The application 1818, being implemented in the form of executable program code, can be executed by the data processing system 1800, e.g., by the processor 1802. Responsive to executing the application, the data processing system 1800 may be configured to perform one or more operations or method steps described herein.

Figure 19:
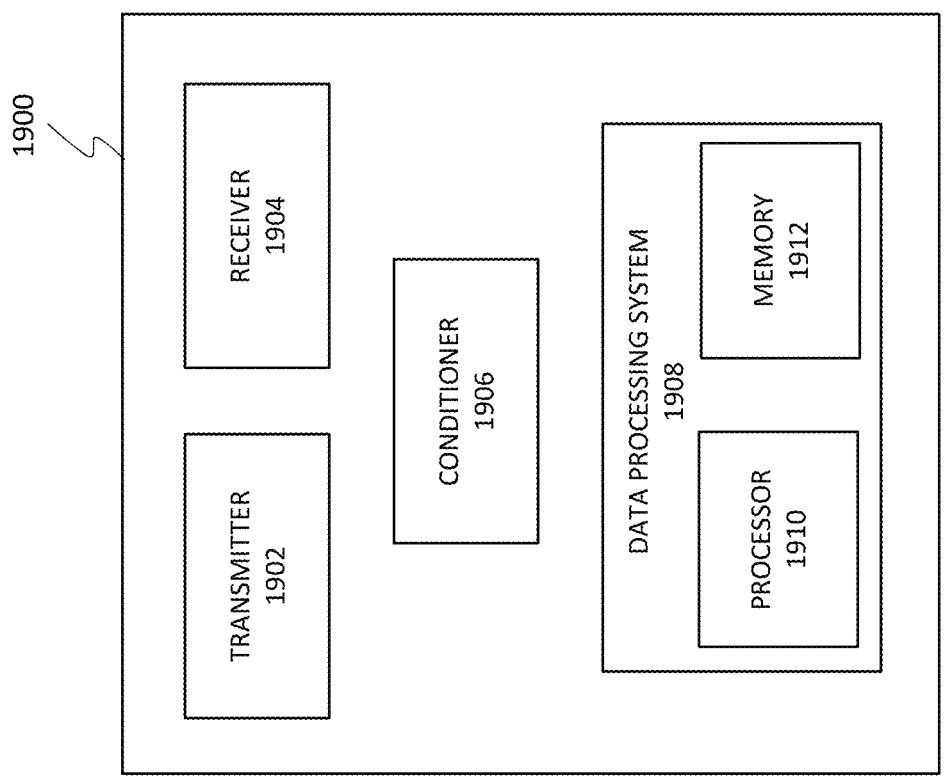
FIG. 19 illustrates a system view of an exemplary radio or sonar receiver configured to implement scaling of fixed-point FFTs, according to some embodiments of the disclosure.

Exemplary Radar or Sonar System Utilizing the Improved Scaling of Fixed-Point FFTs FIG. 19 illustrates a system view of an exemplary radio or sonar system 1900 configured to implement scaling of fixed-point FFTs, according to some embodiments of the disclosure. The system 1900 includes at least a transmitter 1902 for transmitting signals to be reflected from objects, which would be a radar transmitter in case the system 1900 is a radar system and a sonar transmitter in case the system 1900 is a sonar system.

The transmitter 1902 may include a chirp signal generator. Various means for generating chirp signals are known in the art, such as e.g. using a YIG oscillator, employing analog circuit with a voltage-controlled oscillator (VCO) and linearly or exponentially ramping control voltage, or generating chirp signals digitally using a digital signal processor (DSP), a digital-to-analog converter (DAC), and a direct digital synthesizer (DDS) and by varying the step in the numerically controlled oscillator. All of the means and manners for generating a chirp signal are within the scope of the present disclosure.

The system 1900 further includes a sensor 1904 for detecting signals, e.g. one or more radio antennas in case the system 1900 is a radar system and one or more sonar sensors in case the system 1900 is a sonar system.

The system 1900 may also include a data processing system 1908 comprising at least a processor 1910 and a memory 1912 for carrying out a method utilizing the scaling of fixed-point FFTs and implementing various aspects of data processing functionality described herein. In some embodiments, the data processing system 1908 may be implemented as the system 1800 illustrated in FIG. 18.

In some embodiments, the data processing system 1908 may be configured to carry out the method 1700 illustrated in FIG. 17 as well as other processing features described herein, such as e.g. processing described in section "Basics of FFTs and their application in radar and sonar systems" described above.

Optionally, the radio or sonar receiver may also include a signal conditioner 1906 configured to condition the signal as acquired by the receiver 1904 prior to supplying the conditioned signal as an input signal to the data processing system 1908. Such conditioning may include one or more of e.g. analog to digital conversion, filtering based on one or more predefined criteria (e.g. applying a passband filter to only process signals in a limited band of frequencies), amplification, etc.

Implementing the improved scaling as described herein, enables implementing the radar/sonar system 1900 using fixed-point FFTs, advantageously decreasing cost and power consumption of the system.

While FIG. 19 illustrates the data processing system 1908 to be included within the system 1900, in other embodiments, the data processing system 1908 may be implemented external to the system 1900, in which case the data processing system 1908 may be configured to control the system 1900 remotely, via any appropriate communication channel. In other words, instead of being implemented within the system 1900 as shown in FIG. 19, the data processing system 1908 may be external to the system 1900 and be communicatively coupled to the system 1900.

EXAMPLES

Example 1 provides a radar system comprising a radar transmitter configured to transmit a radio signal, a radar receiver configured to detect a signal comprising at least a portion of the transmitted radio signal reflected from an object and to generate an input signal based on the detected signal, and a data processing system. The data processing system is configured to provide the input signal as an input to a Fast Fourier Transform (FFT) algorithm comprising two or more butterfly stages, scale an output of every pair of consecutive butterfly stages by a scaling factor equal to two times of the inverse of a growth factor for the pair of consecutive butterfly stages for the FFT algorithm for a complex exponential input signal, and determine one or more of an indication of a distance to the object, an indication of a velocity of the object, and an indication of a location of the object based on an output of the FFT algorithm.

Example 2 provides a radar system as in Example 1, where the FFT algorithm comprises a radix-2 algorithm and where the scaling comprises scaling one butterfly stage of the every pair by a scaling factor of 1 and scaling another butterfly stage of the every pair of consecutive butterfly stages by a scaling factor of ½.

Example 3 provides a radar system as in Example 1, where the FFT algorithm comprises a radix-4 algorithm and where the scaling comprises scaling each butterfly stage by a scaling factor of ½.

Example 4 provides a radar system as the system in any one of the Examples described above, where the input signal comprises a substantially complex exponential signal or a substantially sinusoidal signal.

Example 5 provides a radar system as the system in any one of the Examples described above, where the data processing system is configured to scale the output of every pair of consecutive butterfly stages allowing unlimited clipping of the input signal due to saturation.

Example 6 provides a radar system as the system in any one of the Examples described above, where the data processing system is further configured to ensure that the input signal is saturated instead of being wrapped around.

Example 7 provides a radar system as the system in any one of the Examples described above, where the data processing system is configured to carry out the FFT algorithm by applying a horizontal windowed FFT algorithm on rows of data samples of the input signal and by applying a vertical windowed FFT algorithm on an output of the horizontal windowed FFT algorithm to generate the output of the FFT algorithm.

Example 8 provides a radar system as the system in any one of the Examples described above, where the data processing system is configured to identify zero or more peaks within the output of the FFT algorithm, and where the determination of the one or more of the indication of the distance to the object, the indication of the velocity of the object, and the indication of the location of the object is performed based on the identified zero or more peaks.

Example 9 provides a radar system as the system in any one of the Examples described above, where the radio signal comprises a chirp signal.

Example 10 provides a radar system as the system in any one of the Examples described above, where the FFT algorithm comprises a fixed-point FFT algorithm.

Example 11 provides a sonar system comprising a sonar transmitter configured to transmit a sonar signal, a sonar receiver configured to detect a signal comprising at least a portion of the transmitted sonar signal reflected from an object and to generate an input signal based on the detected signal, and a data processing system. The data processing system is configured to provide the input signal as an input to an FFT algorithm comprising two or more butterfly stages, scale an output of every pair of consecutive butterfly stages by a scaling factor equal to two times of the inverse of a growth factor for the pair of consecutive butterfly stages for the FFT algorithm for a complex exponential input signal, and determine one or more of an indication of a distance to the object, an indication of a velocity of the object, and an indication of a location of the object based on an output of the FFT algorithm.

Example 12 provides a sonar system as in Example 11, where the FFT algorithm comprises a radix-2 algorithm and where the scaling comprises scaling one butterfly stage of the every pair by a scaling factor of 1 and scaling another butterfly stage of the every pair of consecutive butterfly stages by a scaling factor of ½.

Example 13 provides a sonar system as in Example 12, where the FFT algorithm comprises a radix-4 algorithm and where the scaling comprises scaling each butterfly stage by a scaling factor of ½.

Example 14 provides a sonar system as the sonar system in any one of the Examples described above, where the input signal comprises a substantially complex exponential signal or a substantially sinusoidal signal.

Example 15 provides a sonar system as the sonar system in any one of the Examples described above, where the data processing system is configured to scale the output of every pair of consecutive butterfly stages allowing unlimited clipping of the input signal due to saturation.

Example 16 provides a sonar system as the sonar system in any one of the Examples described above, where the data processing system is further configured to ensure that the input signal is saturated instead of being wrapped around.

Example 17 provides a sonar system as the sonar system in any one of the Examples described above, where the data processing system is configured to carry out the FFT algorithm by applying a horizontal windowed FFT algorithm on rows of data samples of the input signal and by applying a vertical windowed FFT algorithm on an output of the horizontal windowed FFT algorithm to generate the output of the FFT algorithm.

Example 18 provides a sonar system as the sonar system in any one of the Examples described above, where the data processing system is configured to identify zero or more peaks within the output of the FFT algorithm, and where the determination of the one or more of the indication of the distance to the object, the indication of the velocity of the object, and the indication of the location of the object is performed based on the identified zero or more peaks.

Example 19 provides a sonar system as the sonar system in any one of the Examples described above, where the sonar signal comprises a chirp signal.

Example 20 provides a sonar system as the sonar system in any one of the Examples described above, where the FFT algorithm comprises a fixed-point FFT algorithm.

Example 21 provides a data processing system to be used with a radar system or a sonar system as in any of the Examples described above.

Example 22 provides a method performed by a data processing system as in any of the Examples described above.

Example 23 provides a non-transitory computer-readable storage medium storing instructions which, when executed on a processor of a computer, carry out a method performed by a data processing system as in any of the Examples described above.

Example 24 provides a computer program configuring a data processing system to carry out functionality as in any of the Examples described above.

Variations and Implementations

While embodiments of the present disclosure were described above with references to exemplary implementations as shown in FIGS. 3-19, a person skilled in the art will realize that the various teachings described above are applicable to a large variety of other implementations. In particular, while some descriptions provided in the present disclosure refer to radix-2 FFTs, these descriptions are applicable to other FFTs implemented with stages. Further, while examples provided herein are described with reference to an FFT comprising 5 stages and to a 16-bit integer FFT, of course in other implementations any other number of stages and any number of bits could be used.

In certain contexts, the features discussed herein can be applicable to automotive systems, safety-critical industrial applications, medical systems, scientific instrumentation, wireless and wired communications, radar, industrial process control, audio and video equipment, current sensing, instrumentation (which can be highly precise), and other digital-processing-based systems.

Moreover, certain embodiments discussed above can be provisioned in digital signal processing technologies for medical imaging, patient monitoring, medical instrumentation, and home healthcare. This could include pulmonary monitors, accelerometers, heart rate monitors, pacemakers, etc. Other applications can involve automotive technologies for safety systems (e.g., stability control systems, driver assistance systems, braking systems, infotainment and interior applications of any kind).

In yet other example scenarios, the teachings of the present disclosure can be applicable in the industrial markets that include process control systems that help drive productivity, energy efficiency, and reliability. In consumer applications, the teachings of the signal processing circuits discussed above can be used for image processing, auto focus, and image stabilization (e.g., for digital still cameras, camcorders, etc.). Other consumer applications can include audio and video processors for home theater systems, DVD recorders, and high-definition televisions.

In the discussions of the embodiments above, components of a system, such as e.g. clocks, multiplexers, buffers, and/or other components can readily be replaced, substituted, or otherwise modified in order to accommodate particular circuitry needs. Moreover, it should be noted that the use of complementary electronic devices, hardware, software, etc. offer an equally viable option for implementing the teachings of the present disclosure related to virtual dithering.

Parts of various systems for implementing scaling functionality of fixed-point FFTs as proposed herein can include electronic circuitry to perform the functions described herein. In some cases, one or more parts of the system can be provided by a processor specially configured for carrying out the functions described herein. For instance, the processor may include one or more application specific components, or may include programmable logic gates which are configured to carry out the functions describe herein. The circuitry can operate in analog domain, digital domain, or in a mixed signal domain. In some instances, the processor may be configured to carrying out the functions described herein by executing one or more instructions stored on a non-transitory computer readable storage medium.

In one example embodiment, any number of electrical circuits of FIGS. 3, 18 and 19 may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of FIGS. 3, 18 and 19 may be implemented as stand-alone modules (e.g., a device with associated components and circuitry configured to perform a specific application or function) or implemented as plug-in modules into application specific hardware of electronic devices. Note that particular embodiments of the present disclosure implementing scaling functionality of fixed-point FFTs may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the scaling functionality of fixed-point FFTs proposed herein may be implemented in one or more silicon cores in Application Specific Integrated Circuits (ASICs), Field Programmable Gate Arrays (FPGAs), and other semiconductor chips.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of FIGS. 3 and 18-19 may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of FIGS. 3, 18 and 19 and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that the functions related to the scaling functionality of fixed-point FFTs as proposed herein illustrate only some of the possible functions that may be executed by, or within, system illustrated in FIGS. 3, 18 and 19. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Note that all optional features of the apparatus described above may also be implemented with respect to the method or process described herein and specifics in the examples may be used anywhere in one or more embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

Although the claims are presented in single dependency format in the style used before the USPTO, it should be understood that any claim can depend on and be combined with any preceding claim of the same type unless that is clearly technically infeasible.

What is claimed is:

1. A system comprising:
a transmitter configured to transmit a signal;
a receiver configured to detect a signal comprising at least a portion of the transmitted signal reflected from an object and to generate an input signal based on the detected signal; and
a data processing system configured to:
provide the input signal as an input to a Fast Fourier Transform (FFT) algorithm comprising two or more butterfly stages;
scale an output of every pair of butterfly stages by a scaling factor equal to two times of the inverse of a growth factor for the pair of butterfly stages for the FFT algorithm for a complex exponential input signal; and
determine one or more of an indication of a distance to the object, an indication of a velocity of the object, and an indication of a location of the object based on an output of the FFT algorithm.

2. The system according to claim 1, wherein the FFT algorithm comprises a radix-2 algorithm and wherein the scaling comprises scaling one butterfly stage of the every pair by a scaling factor of 1 and scaling another butterfly stage of the every pair of consecutive butterfly stages by a scaling factor of $\frac{1}{2}$.

3. The system according to claim 1, wherein the FFT algorithm comprises a radix-4 algorithm and wherein the scaling comprises scaling each butterfly stage by a scaling factor of $\frac{1}{2}$.

4. The system according to claim 1, wherein the input signal comprises a substantially complex exponential signal or a substantially sinusoidal signal.

5. The system according to claim 1, wherein the data processing system is configured to scale the output of every pair of butterfly stages allowing unlimited clipping of the input signal due to saturation.

6. The system according to claim 1, wherein the data processing system is further configured to ensure that the input signal is saturated instead of being wrapped around.

7. The system according to claim 1, wherein the data processing system is configured to carry out the FFT algorithm by applying a horizontal windowed FFT algorithm on rows of data samples of the input signal and by applying a vertical windowed FFT algorithm on an output of the horizontal windowed FFT algorithm to generate the output of the FFT algorithm.

8. The system according to claim 1, wherein the data processing system is configured to identify zero or more peaks within the output of the FFT algorithm, and wherein the determination of the one or more of the indication of the distance to the object, the indication of the velocity of the object, and the indication of the location of the object is performed based on the identified zero or more peaks.

9. The system according to claim 1, wherein the signal comprises a chirp signal.

10. The system according to claim 1, wherein the FFT algorithm comprises a fixed-point FFT algorithm.

11. A method of processing a complex exponential or a sinusoidal input signal:
receiving the input signal at an input to a Fast Fourier Transform (FFT) algorithm comprising two or more butterfly stages;
generating an output signal by:
performing butterfly operations on the input signal at the two or more butterfly stages, and
scaling an output of every pair of consecutive butterfly stages by a scaling factor equal to two times of the inverse of a growth factor for the pair of consecutive butterfly stages for the FFT algorithm for a complex exponential signal; and providing the output signal at an output of the FFT algorithm.

12. The method according to claim 11, further comprising:
determining one or more of an indication of a distance to an object, an indication of a velocity of the object, and an indication of a location of the object based on the output of the FFT algorithm.

13. The method according to claim 11, further comprising:
allowing overflow at one or more of the two or more butterfly stages.

14. The method according to claim 11, wherein the FFT algorithm comprises a radix-2 algorithm and wherein the scaling comprises scaling one butterfly stage of the every pair by a scaling factor of 1 and scaling another butterfly stage of the every pair of consecutive butterfly stages by a scaling factor of ½.

15. The method according to claim 11, wherein the FFT algorithm comprises a radix-4 algorithm and wherein the scaling comprises scaling each butterfly stage by a scaling factor of ½.

16. A digital signal processing system for processing a complex exponential or a sinusoidal input signal received at an input to a Fast Fourier Transform (FFT) algorithm comprising two or more butterfly stages to generate an output signal, the system comprising:
means for generating an output of the FFT algorithm by performing butterfly operations on the input signal at the two or more butterfly stages, and
scaling an output of every pair of consecutive butterfly stages by dividing the output of every pair of consecutive butterfly stages by half of a growth factor for the pair of consecutive butterfly stages for the FFT algorithm for a complex exponential signal.

17. The system according to claim 16, further comprising:
means for determining one or more of an indication of a distance to an object, an indication of a velocity of the object, and an indication of a location of the object based on the output of the FFT algorithm.

18. The system according to claim 16, wherein each butterfly stage of the two or more butterfly stages belongs to only one pair of consecutive butterfly stages.

19. The system according to claim 16, wherein the FFT algorithm comprises a radix-2 algorithm and wherein the scaling comprises dividing an output of one butterfly stage of the every pair of consecutive butterfly stages by two and not scaling an output of other butterfly stage of the every pair of consecutive butterfly stages.

20. The system according to claim 16, wherein the FFT algorithm comprises a radix-4 algorithm and wherein the scaling comprises dividing an output of each butterfly stage of every pair of consecutive butterfly stages by two.

* * * * *